United States Patent
Kim et al.

(10) Patent No.: US 10,031,604 B2
(45) Date of Patent: Jul. 24, 2018

(54) CONTROL METHOD OF VIRTUAL TOUCHPAD AND TERMINAL PERFORMING THE SAME

(71) Applicant: HiDeep Inc., Gyeonggi-do (KR)

(72) Inventors: Seyeob Kim, Gyeonggi-do (KR);
Yunjoung Kim, Gyeonggi-do (KR);
Hyongsub Yun, Gyeonggi-do (KR);
Sangsic Yoon, Gyeonggi-do (KR);
Bonkee Kim, Gyeonggi-do (KR);
Hojun Moon, Gyeonggi-do (KR);
Taehoon Kim, Gyeonggi-do (KR);
Sunyoung Kwon, Gyeonggi-do (KR)

(73) Assignee: HiDeep Inc. (KR)

( * ) Notice: Subject to any disclaimer, the term of this patent is extended or adjusted under 35 U.S.C. 154(b) by 204 days.

(21) Appl. No.: 14/556,527

(22) Filed: Dec. 1, 2014

(65) Prior Publication Data
US 2015/0153951 A1 Jun. 4, 2015

(30) Foreign Application Priority Data

Nov. 29, 2013 (KR) .................. 10-2013-0147581
Dec. 9, 2013 (KR) .................. 10-2013-0152493
(Continued)

(51) Int. Cl.
*G06F 15/00* (2006.01)
*G06F 13/00* (2006.01)
(Continued)

(52) U.S. Cl.
CPC ............ *G06F 3/0414* (2013.01); *G06F 3/044* (2013.01); *G06F 2203/04103* (2013.01); *G06F 2203/04106* (2013.01)

(58) Field of Classification Search
CPC .............................. G06F 3/0488; G06F 3/0414
(Continued)

(56) References Cited

U.S. PATENT DOCUMENTS

2007/0152982 A1* 7/2007 Kim ................. G06F 3/016
345/173
2007/0200822 A1* 8/2007 Iso ................. G06F 3/0426
345/156
(Continued)

FOREIGN PATENT DOCUMENTS

JP 2012247938 12/2012
JP 2013030050 2/2013
(Continued)

OTHER PUBLICATIONS

Corresponding Office Action issued by the KIPO dated Sep. 25, 2015.
(Continued)

*Primary Examiner* — Kevin Nguyen
(74) *Attorney, Agent, or Firm* — The Belles Group, P.C.

(57) ABSTRACT

A virtual touch pad operation method includes: determining whether or not a hovering input or a touch input to a touch screen meets a predetermined condition; entering a virtual touch pad mode when the hovering input or the touch input meets the predetermined condition; and operating a virtual touch pad. A terminal includes: a touch screen; and a controller which controls a hovering input or a touch input to the touch screen and displays a virtual touch pad on a portion of the touch screen by the hovering input, or the terminal includes: a touch screen, and a controller which distinguishes a touch input to a virtual touch pad in accordance with a pressure magnitude or area of the touch and controls the operation of the virtual touch pad. The virtual touch pad is formed on a portion of the touch screen by the touch input satisfying a predetermined condition.

31 Claims, 24 Drawing Sheets

(30) Foreign Application Priority Data

| Feb. 20, 2014 | (KR) | ........................ 10-2014-0019542 |
| Mar. 24, 2014 | (KR) | ........................ 10-2014-0034169 |
| May 9, 2014 | (KR) | ........................ 10-2014-0055732 |
| Aug. 1, 2014 | (KR) | ........................ 10-2014-0098917 |
| Sep. 19, 2014 | (KR) | ........................ 10-2014-0124920 |
| Oct. 24, 2014 | (KR) | ........................ 10-2014-0145022 |

(51) Int. Cl.
 *G06F 3/041* (2006.01)
 *G06F 3/044* (2006.01)

(58) Field of Classification Search
 USPC ................................. 715/773, 701, 702, 863
 See application file for complete search history.

(56) References Cited

U.S. PATENT DOCUMENTS

| 2008/0109763 | A1* | 5/2008 | Lee ....................... G06F 3/0488 715/856 |
| 2011/0047459 | A1* | 2/2011 | Van Der Westhuizen .......... G06F 1/1692 715/702 |
| 2011/0169749 | A1* | 7/2011 | Ganey .................. G06F 1/1626 345/173 |
| 2012/0062501 | A1* | 3/2012 | Yao ......................... G06F 3/045 345/174 |
| 2013/0241829 | A1* | 9/2013 | Kim ..................... G06F 3/04886 345/157 |
| 2015/0082230 | A1* | 3/2015 | Lee ...................... G06F 3/04886 715/773 |
| 2015/0301578 | A1* | 10/2015 | Seo ........................ G06F 1/3206 713/320 |

FOREIGN PATENT DOCUMENTS

| JP | 2013130979 | 7/2013 |
| KR | 1020060071353 | 6/2006 |
| KR | 1020110018589 | 2/2011 |
| KR | 1020130102834 | 9/2013 |

OTHER PUBLICATIONS

Corresponding Office Action issued by the KIPO dated Oct. 30, 2014.
Corresponding Office Action issued by the JPO dated Jan. 12, 2016.
Corresponding Office Action issued by the KIPO dated Feb. 3, 2015.
Corresponding Office Action issued by the KIPO dated May 21, 2015.

* cited by examiner

CONTROL METHOD OF VIRTUAL TOUCHPAD AND TERMINAL PERFORMING THE SAME

CROSS REFERENCE TO RELATED APPLICATIONS

Priority is claimed under 35 U.S.C. § 119 to the following foreign patent applications:

Korean Patent Application No. 10-2013-0152493, filed Dec. 9, 2013;
Korean Patent Application No. 10-2014-0019542, filed Feb. 20, 2014;
Korean Patent Application No. 10-2014-0034169, filed Mar. 24, 2014;
Korean Patent Application No. 10-2014-0055732, filed May 9, 2014;
Korean Patent Application No. 10-2014-0098917, filed Aug. 1, 2014;
Korean Patent Application No. 10-2014-0124920, filed Sep. 19, 2014; and
Korean Patent Application No. 10-2014-0145022, filed Oct. 24, 2014.

The disclosures of each of the aforementioned priority applications are incorporated herein by reference in their entirety.

FIELD OF THE INVENTION

The present invention relates to a virtual touch pad operation method and a terminal performing the same, and more particularly to a virtual touch pad operation method for allowing a user to operate the terminal by one hand and a terminal performing the operation.

BACKGROUND OF THE INVENTION

A touch screen is used in various portable electronic devices such as a personal digital assistant (PDA), a tabletop and a mobile device. The touch screen can be operated by a pointing device (or a stylus) or a finger.

However, since an input device of a device including the touch screen generally has a fixed shape and size, it is very difficult or impossible to customize the input device of the device for the purpose of user's convenience. Moreover, the device including the touch screen tends to have wider and bigger touch screen, and thus, a user has a difficulty in operating the device by one hand throughout the touch screen.

Also, regarding a touch technology used in a touch panel, the user is allowed to operate user interface by necessarily touching the screen. Here, the screen of the panel may be damaged with the increase of the number of the touches. Therefore, there is a need to improve the user's convenience by providing an intuitive interfacing technology of providing a natural interface and of enhancing the interaction between humans and computers.

SUMMARY OF THE INVENTION

One embodiment is a virtual touch pad operation method. The virtual touch pad operation method may include: determining whether or not a hovering input or a touch input to a touch screen meets a predetermined condition; entering a virtual touch pad mode when the hovering input or the touch input meets the predetermined condition; and operating a virtual touch pad.

Another embodiment is a terminal. The terminal may include: a touch screen; and a controller which controls a hovering input or a touch input to the touch screen and displays a virtual touch pad on a portion of the touch screen by the hovering input.

Further another embodiment is a terminal. The terminal may include: a touch screen, and a controller which distinguishes a touch input to a virtual touch pad in accordance with a pressure magnitude or area of the touch and controls the operation of the virtual touch pad. The virtual touch pad is formed on a portion of the touch screen by the touch input satisfying a predetermined condition.

DETAILED DESCRIPTION OF THE INVENTION

Figure 1:
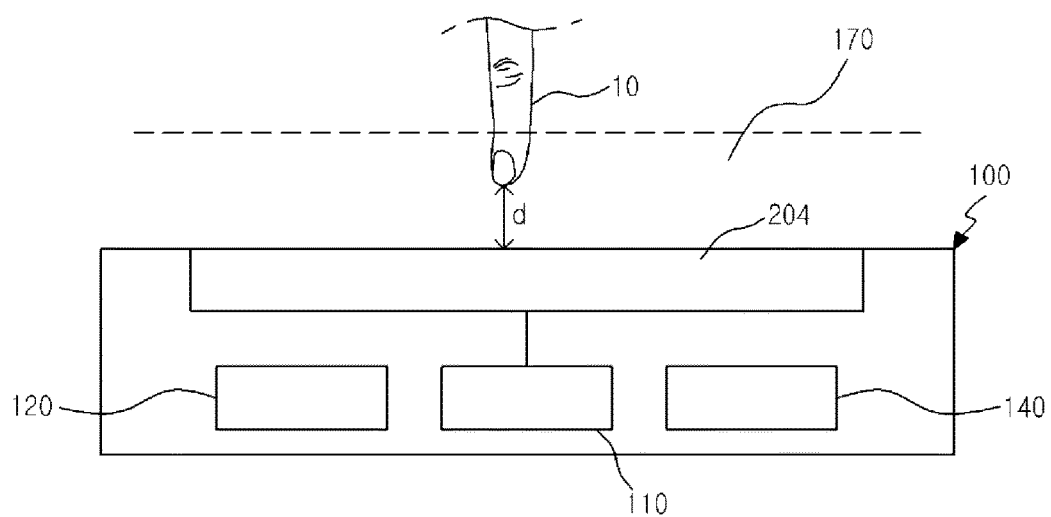
FIG. 1 is a structure view of a terminal according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a terminal 100 including a touch screen 204 according to the embodiment of the present invention will be described with reference to the accompanying drawings. Prior to the description of the functions and features of the terminal 100 according to the embodiment of the present invention, the touch screen 204 included in the terminal 100 will be described in detail with reference to FIGS. 15 to 23.

Figure 15:
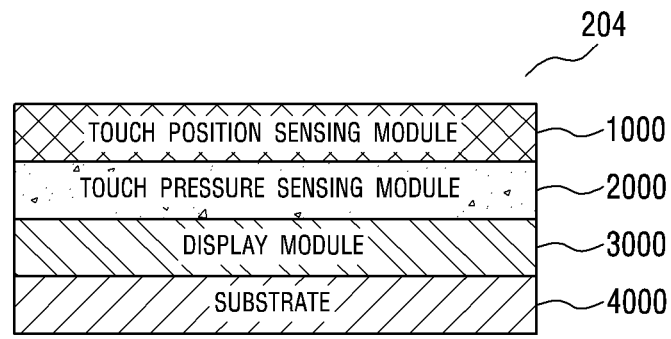
FIG. 15 shows a structure of the touch screen according to the first embodiment.

FIG. 15 shows a structure of the touch screen according to a first embodiment.

As shown in FIG. 15, the touch screen 204 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 may display in such a manner as to allow a user to visually check contents. Here, the display module 3000 may display by means of a display driver. The display driver (not shown) is a software allowing an operating system to manage or control a display adaptor and is a kind of a device driver.

FIGS. 16a to 16d show a structure of a touch position sensing module of the touch screen according to the first embodiment. FIGS. 23a to 23d are structure views showing the shape of an electrode formed in the touch sensing module according to the embodiment.

Figure 16A:
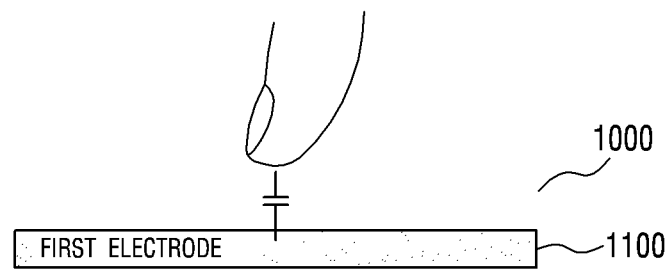
FIGS. 16a to 16d show a structure of a touch position sensing module of the touch screen according to the first embodiment.
Figure 23A:
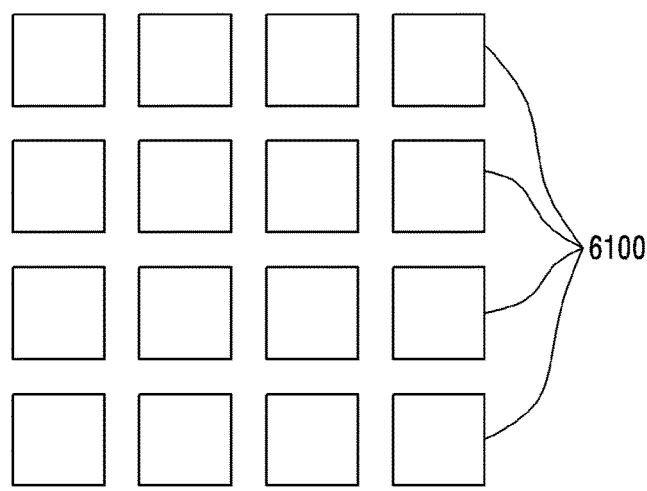
FIGS. 23a to 23d are structure views showing the shape of an electrode formed in the touch sensing module according to the embodiment.

As shown in FIG. 16a, the touch position sensing module 1000 according to the embodiment may include a first electrode 1100 formed in one layer. Here, the first electrode 1100 may be, as shown in FIG. 23a, comprised of a plurality of electrodes 6100, and then a driving signal may be input to each electrode 6100 and a sensing signal including information on self-capacitance may be output from each electrode. When an object like a user's finger approaches the first electrode 1100, the finger functions as a ground and the self-capacitance of first electrode 1100 is changed. Therefore, the terminal 100 is able to detect the touch position by measuring the self-capacitance of the first electrode 1100, which is changed as the object like the user's finger approaches the touch screen 204.

Figure 16B:
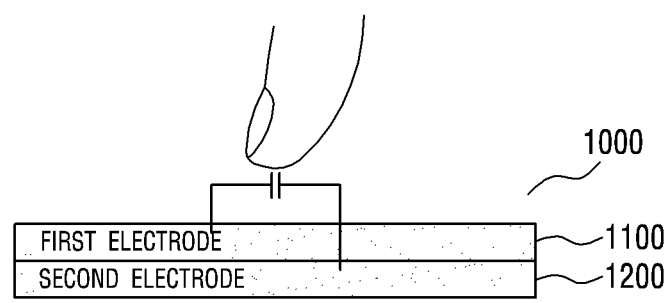

As shown in FIG. 16b, the touch position sensing module 1000 according to the embodiment may include the first electrode 1100 and a second electrode 1200, which are formed on different layers.

Figure 16C:
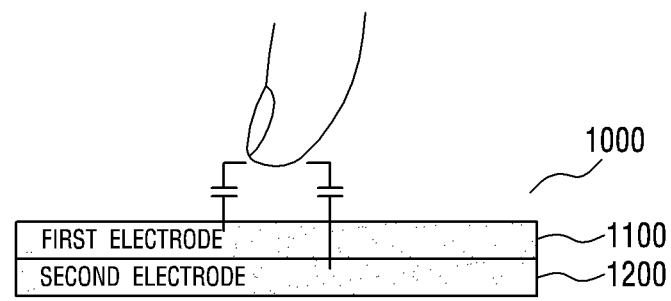
Figure 23B:
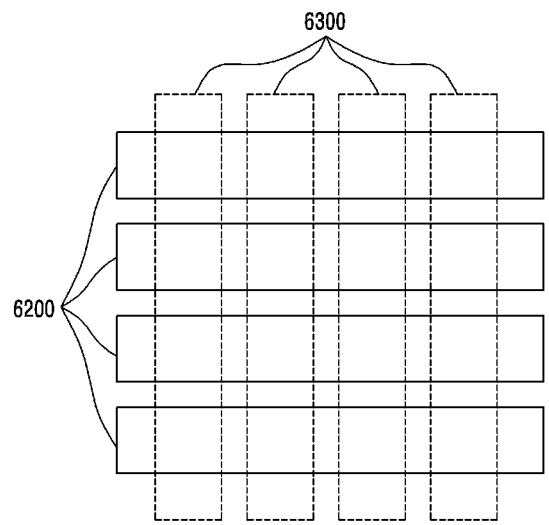

Here, the first and the second electrodes 1100 and 1200 are, as shown in FIG. 23b, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 16b, when the object like the user's finger approaches the first electrode 1100 and the second electrode 1200, the finger functions as a ground, so that the mutual capacitance between the first electrode 1100 and the second electrode 1200 is changed. In this case, the terminal 100 measures the mutual capacitance between the first electrode 1100 and the second electrode 1200, which is changed with the approach of the object like the user's finger to the touch screen 204, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 16c, when the object like the user's finger approaches the first electrode 1100 and the second electrode 1200, the finger functions as a ground, so that the self-capacitance of each of the first and second electrodes 1100 and 1200 is changed. In this case, the terminal 100 measures the self-capacitances of the first electrode 1100 and the second electrode 1200, which is changed with the approach of the object like the user's finger to the touch screen 204, and then detects the touch position.

Figure 16D:
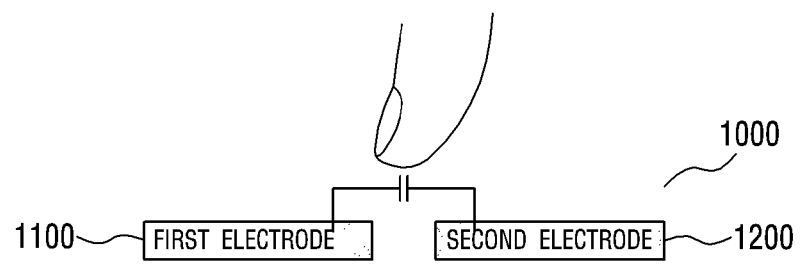

As shown in FIG. 16d, the touch position sensing module 1000 according to the embodiment may include the first electrode 1100 formed in one layer and the second electrode 1200 formed in the same layer as the layer in which the first electrode 1100 has been formed.

Figure 23C:
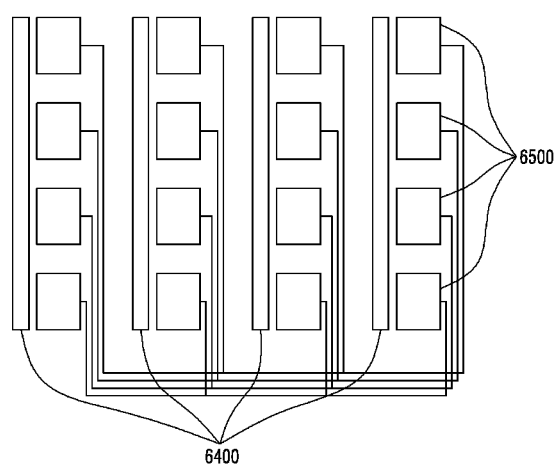

Here, the first and the second electrodes 1100 and 1200 are, as shown in FIG. 23c, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the each first electrodes 6400. A principle of detecting the touch position by using the first electrode 6400 or the second electrode 6500 shown in FIG. 16d is the same as that of the foregoing referring to FIG. 16c, and thus a description of the principle will be omitted.

FIGS. 17a to 17f show a structure of the touch pressure sensing module according to the first embodiment. FIGS. 23a to 23d are structure views showing the shape of the electrode formed in the touch pressure sensing module 2000 according to the embodiment.

As shown in FIGS. 17a to 17f, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 17a to 17d, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 17a to 17d that the touch pressure sensing module 2000 includes the reference potential layer 2500, there is no limit to this. The touch pressure sensing module 2000 does not include the reference potential layer 2500, and the display module 3000 or the substrate 4000 which is disposed under the touch pressure sensing module 2000 may function as the reference potential layer.

Figure 17A:
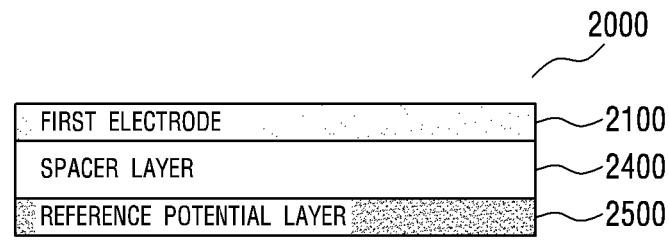
FIGS. 17a to 17f show a structure of a touch pressure sensing module of the touch screen according to the first embodiment.

As shown in FIG. 17a, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Figure 17B:
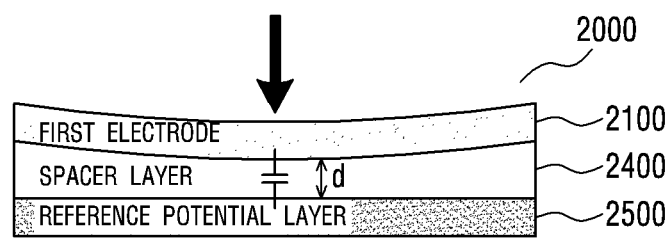
Figure 23D:
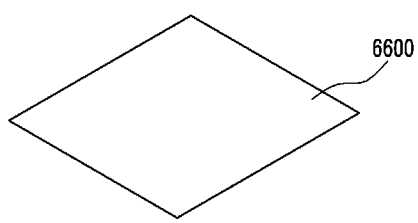

Here, the first electrode 2100 is, as shown in FIG. 23a, comprised of the plurality of electrodes 6100. Then, the driving signal may be input to each of the electrodes 6100 and the sensing signal including information on the self-capacitance may be output from the each electrode. When a pressure is applied to the touch screen 204 by the object like the user's finger or stylus, the first electrode 2100 is, as shown in FIG. 17b, curved at least at the touch position, so that a distance "d" between the first electrode 2100 and the reference potential layer 2500 is changed, and thus, the self-capacitance of the first electrode 2100 is changed. Accordingly, the terminal 100 is able to detect the touch pressure by measuring the self-capacitance of the first electrode 2100, which is changed by the pressure that the object like the user's finger or stylus applies to the touch screen 204. As such, since the first electrode 2100 is comprised of the plurality of electrodes 6100, the terminal 100 is able to detect the pressure of each of multiple touches which have been simultaneously input to the touch screen 204. Also, when there is no requirement for detecting the pressure of each of multiple touches, it is only required to detect overall pressure applied to the touch screen 204 irrespective of the touch position. Therefore, the first electrode 2100 of the touch pressure sensing module 2000 may be, as shown in FIG. 23d, comprised of one electrode 6600.

Figure 17C:
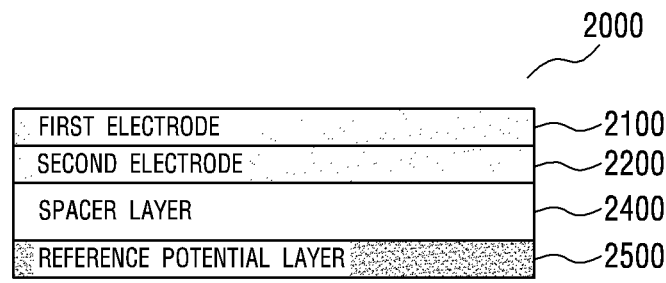

As shown in FIG. 17c, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Figure 17D:
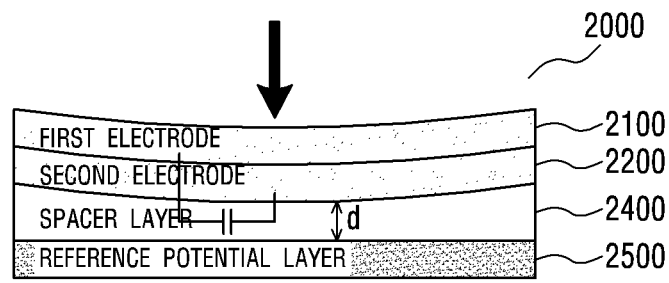

Here, the first electrode 2100 and the second electrode 2200 may be configured and arranged as shown in FIG. 23b. A driving signal is input to any one of the first electrode 6200 and the second electrode 6300, and a sensing signal including information on the mutual capacitance may be output from the other. When a pressure is applied to the touch screen 204, the first electrode 2100 and the second electrode 2200 are, as shown in FIG. 17d, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the terminal 100 is able to detect the touch pressure by measuring the mutual capacitance between the first electrode 2100 and the second electrode 2200, which is changed by the pressure that is applied to the touch screen 204. As such, since the first electrode 2100 and the second electrode 2200 are comprised of the plurality of first electrodes 6200 and the plurality of second electrodes 6300 respectively, the terminal 100 is able to detect the pressure of each of multiple touches which have been simultaneously input to the touch screen 204. Also, when there is no requirement for detecting the pressure of each of multiple touches, at least one of the first electrode 2100 and the second electrode 2200 of the touch pressure sensing module 2000 may be, as shown in FIG. 23d, comprised of the one electrode 6600.

Here, even when the first electrode 2100 and the second electrode 2200 are formed in the same layer, the touch pressure can be also detected as described in FIG. 17c. The first electrode 2100 and the second electrode 2200 may be configured and arranged as shown in FIG. 23c, or may be comprised of the one electrode 6600 as shown in FIG. 23d.

Figure 17E:
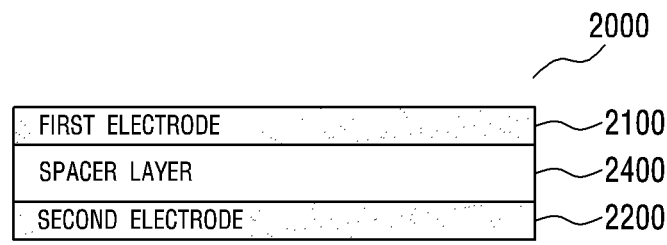

As shown in FIG. 17e, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

Figure 17F:
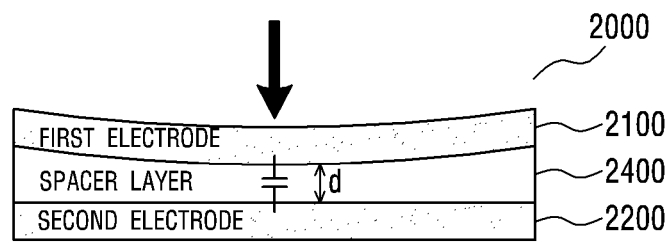

In FIG. 17e, the configuration and operation of the first electrode 2100 and the second electrode 2200 are the same as those of the foregoing referring to FIG. 17c, and thus, a description of the configuration and operation will be omitted. When a pressure is applied to the touch screen 204, the first electrode 2100 is, as shown in FIG. 17f, curved at least at the touch position, so that a distance "d" between the first electrode 2100 and the second electrode 2200 is changed, and thus, the mutual capacitance between the first electrode 2100 and the second electrode 2200 is changed. Accordingly, the terminal 100 is able to detect the touch pressure by measuring the mutual capacitance between the first electrode 2100 and the second electrode 2200.

Figure 18:
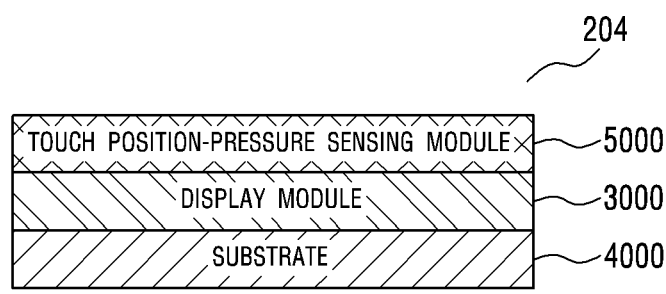
FIG. 18 shows a structure of the touch screen according to the second embodiment.

As shown in FIG. 18, a touch screen 204 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 15, the touch position-pressure sensing module 5000 according to the embodiment shown in FIG. 18 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch screen 204 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval for sensing the touch pressure.

FIGS. 19a to 19k show a structure of the touch position-pressure sensing module according to the second embodiment. As shown in FIGS. 19a to 19k, the touch position-pressure sensing module 5000 according to the second embodiment may include a spacer layer 5400.

As shown in FIGS. 19a to 19i, the touch position-pressure sensing module 5000 according to the embodiment may include a reference potential layer 5500. The reference potential layer 5500 is the same as that of the foregoing referring to FIGS. 17a to 17d, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

Figure 19A:
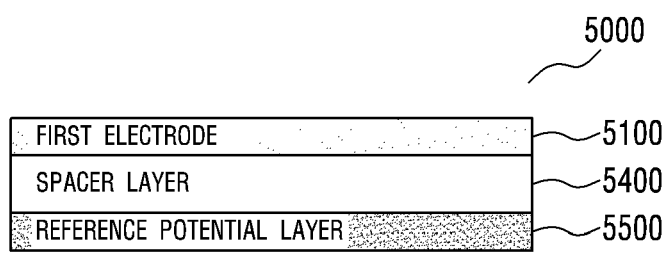
FIGS. 19a to 19k show a structure of a touch position-pressure sensing module of the touch screen according to the second embodiment.

As shown in FIG. 19a, the touch position-pressure sensing module 5000 according to the embodiment may include the first electrode 5100 formed in one layer, the spacer layer 5400 formed under the layer in which the first electrode 5100 has been formed, and the reference potential layer 5500 formed under the spacer layer 5400.

Figure 19B:
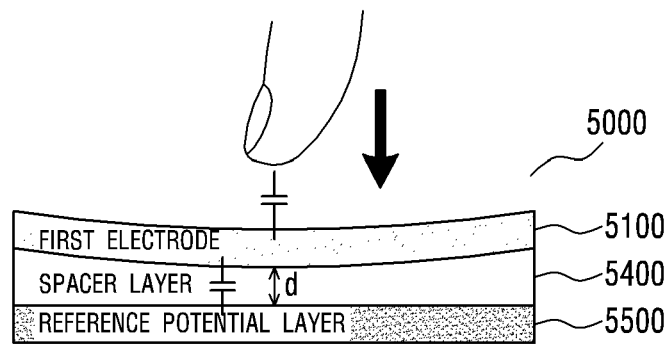

A description of the configuration of FIGS. 19a and 19b is similar to the description referring to FIGS. 17a and 17b. Hereafter, only the difference between them will be described. As shown in FIG. 19b, when the object like the user's finger approaches the first electrode 5100, the finger functions as a ground and the touch position can be detected by the change of the self-capacitance of the first electrode 5100. Also, when a pressure is applied to the touch screen 204 by the object, a distance "d" between the first electrode 5100 and the reference potential layer 5500 is changed, and thus, the touch pressure can be detected by the change of the self-capacitance of the first electrode 5100.

Figure 19C:
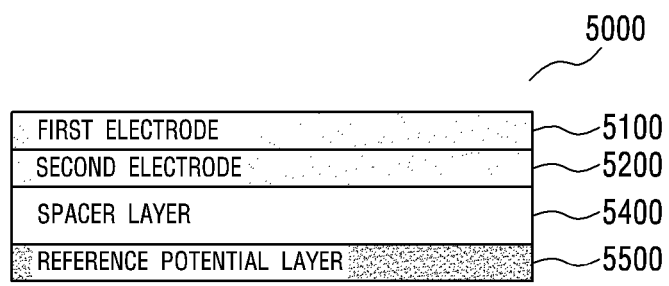

As shown in FIG. 19c, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

Figure 19D:
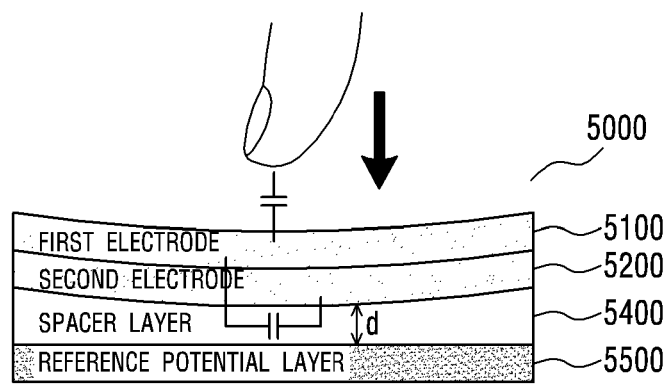

A description of the configuration of FIGS. 19c to 19f is similar to the description referring to FIGS. 17c and 17d. Hereafter, only the difference between them will be described. Here, the first electrode 5100 and the second electrode 5200 may be, as shown in FIG. 23a, comprised of the plurality of electrodes 6100 respectively. As shown in FIG. 19d, when the object like the user's finger approaches the first electrode 5100, the finger functions as a ground and the touch position can be detected by the change of the self-capacitance of the first electrode 5100. Also, when a pressure is applied to the touch screen 204 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 23b, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be detected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 19c and 19d. However, in FIGS. 19c and 19d, regarding the embodiment where the electrode should be configured as shown in FIG. 23b, when the first electrode 5100 and the second electrode 5200 are formed in the same layer, the first electrode 5100 and the second electrode 5200 may be configured as shown in FIG. 23c.

Figure 19E:
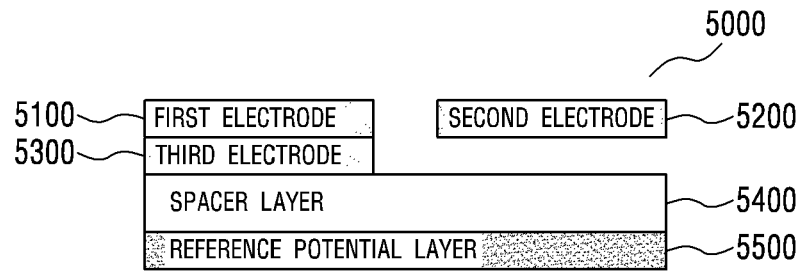

As shown in FIG. 19e, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Figure 19F:
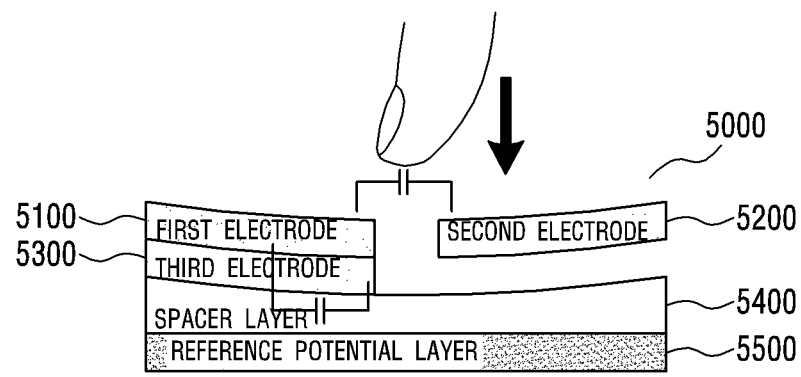

Here, the first electrode 5100 and the second electrode 5200 may be configured and arranged as shown in FIG. 23c, and the first electrode 5100 and the third electrode 5300 may be configured and arranged as shown in FIG. 23b. As shown in FIG. 19f, when the object like the user's finger approaches the first electrode 5100 and the second electrode 5200, the mutual capacitance between the first electrode 5100 and the second electrode 5200 is changed, so that the touch position can be detected. When a pressure is applied to the touch screen 204 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 19G:
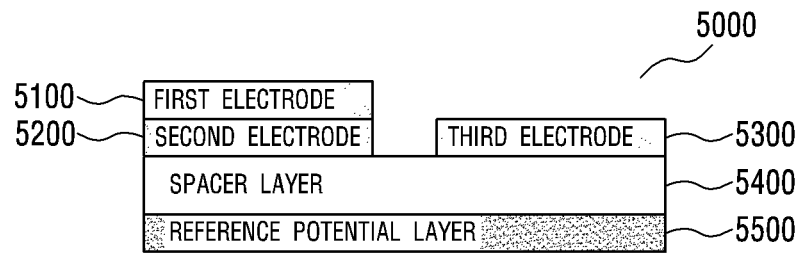

As shown in FIG. 19g, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode

5200 and the third electrode 5300 have been formed, and the reference potential layer 5500 formed under the spacer layer 5400.

Figure 19H:
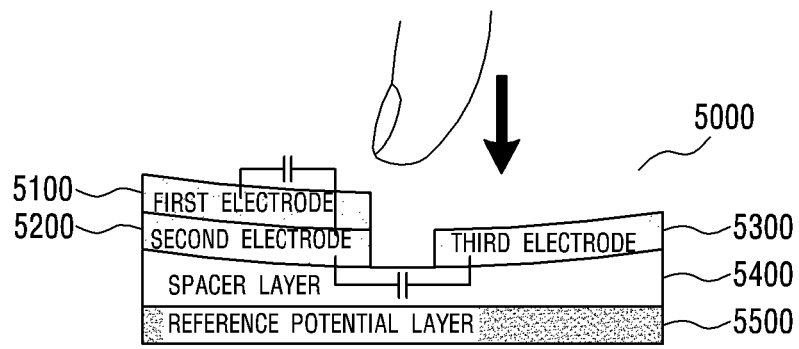

Here, the first electrode 5100 and the second electrode 5200 may be configured and arranged as shown in FIG. 23*b*, and the second electrode 5200 and the third electrode 5300 may be configured and arranged as shown in FIG. 23*c*. In FIG. 19*h*, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 19I:
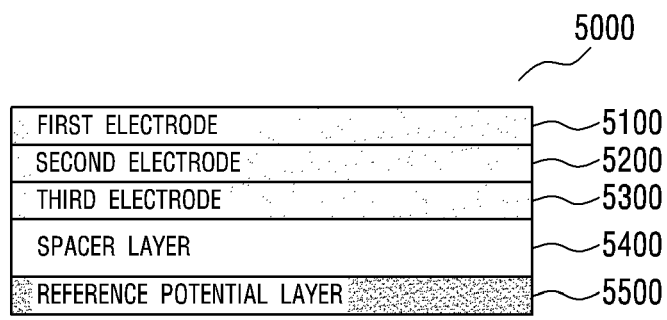

As shown in FIG. 19*i*, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 23*b*, and the second electrode 5200 and the third electrode 5300 may be also configured and arranged as shown in FIG. 23*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 204 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 19J:
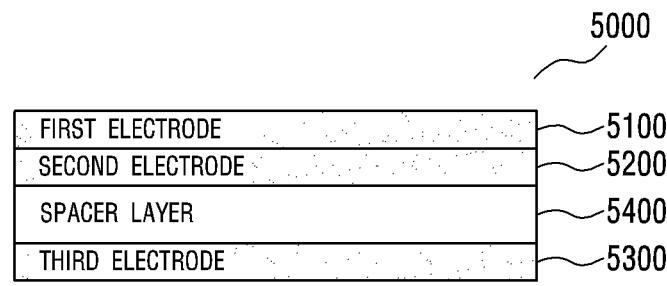

As shown in FIG. 19*j*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 23*b*, and the third electrode 5300 may be configured as shown in FIG. 23*a* or the second electrode 5200 and the third electrode 5300 may be also configured and arranged as shown in FIG. 23*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 204 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 19K:
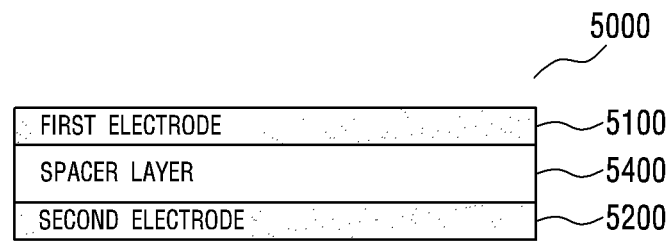

As shown in FIG. 19*k*, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 23*b*. Here, the touch position can be detected by the change of the mutual capacitance between the first electrode 5100 and the second electrode 5200. Also, when a pressure is applied to the touch screen 204 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 23*a*. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

Figure 20:
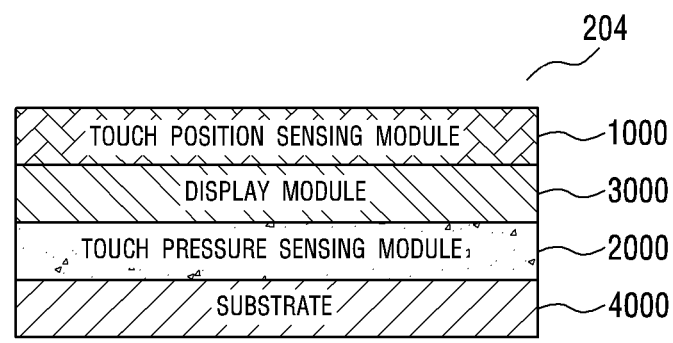
FIG. 20 shows a structure of the touch screen according to the third embodiment.

As shown in FIG. 20, a touch screen 204 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch screens 204 according to the embodiment shown in FIGS. 15 and 18, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch screen 204 can be reduced.

The touch position sensing module 1000 according to the embodiment shown in FIG. 20 is the same as the touch position sensing module shown in FIGS. 16*a* to 16*d*.

Figure 21A:
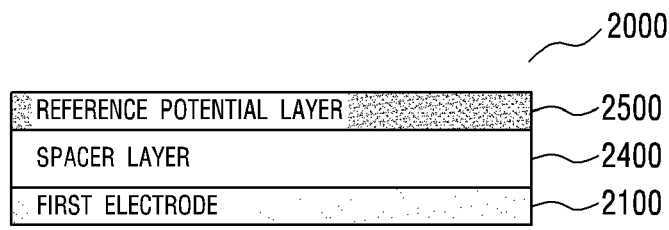
FIGS. 21a to 21b show a structure of a touch pressure sensing module of the touch screen according to the third embodiment.
Figure 21B:
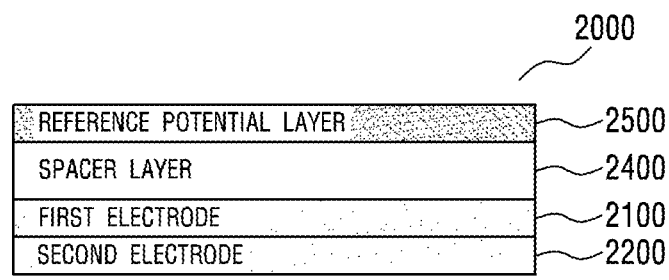

The touch pressure sensing module 2000 according to the embodiment shown in FIG. 20 may be the touch pressure sensing module shown in FIGS. 17*a* to 17*f* and the touch pressure sensing module shown in FIGS. 21*a* to 21*b*.

As shown in FIG. 21a, the touch pressure sensing module 2000 according to the embodiment may include the reference potential layer 2500, the spacer layer 2400 formed under the reference potential layer 2500, and the first electrode 2100 formed under the spacer layer 2400. Since the configuration and operation of FIG. 21a are the same as those of FIGS. 17a and 17b with the exception of the fact that the position of the reference potential layer 2500 and the position of the first electrode 2100 are replaced with each other, repetitive descriptions thereof will be omitted hereafter.

As shown in FIG. 21b, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under the layer in which the first electrode 2100 has been formed. Since the configuration and operation of FIG. 21b are the same as those of FIGS. 17c and 17d with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 17c and 17d.

Although it has been described in FIG. 20 that the display module 3000 is disposed under the touch position sensing module 1000, the touch position sensing module 1000 can be included within the display module 3000. Also, although it has been described in FIG. 20 that the touch pressure sensing module 2000 is disposed under the display module 3000, a portion of the touch pressure sensing module 2000 can be included within the display module 3000. Specifically, the reference potential layer 2500 of the touch pressure sensing module 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch screen 204 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting the touch pressure can be more improved.

Figure 22A:
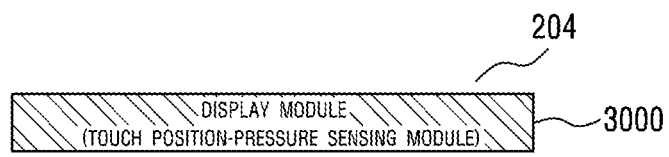
FIG. 22a shows a structure of the touch screen according to a fourth embodiment.

FIG. 22a shows a structure of the touch screen according to a fourth embodiment. As shown in FIG. 22a, the touch screen 204 according to the fourth embodiment may include at least one of the touch position sensing module and the touch pressure sensing module within the display module 3000.

Figure 22B:
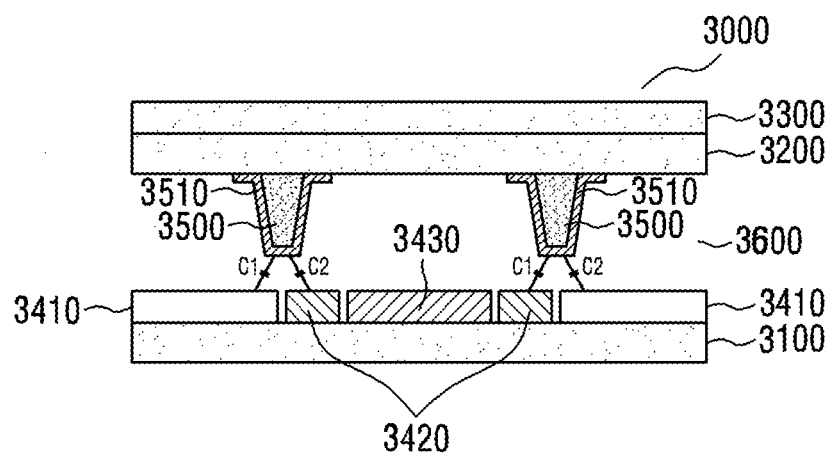
FIGS. 22b and 22c are structure views of touch pressure sensing and touch position sensing of the touch screen according to the fourth embodiment.
Figure 22C:
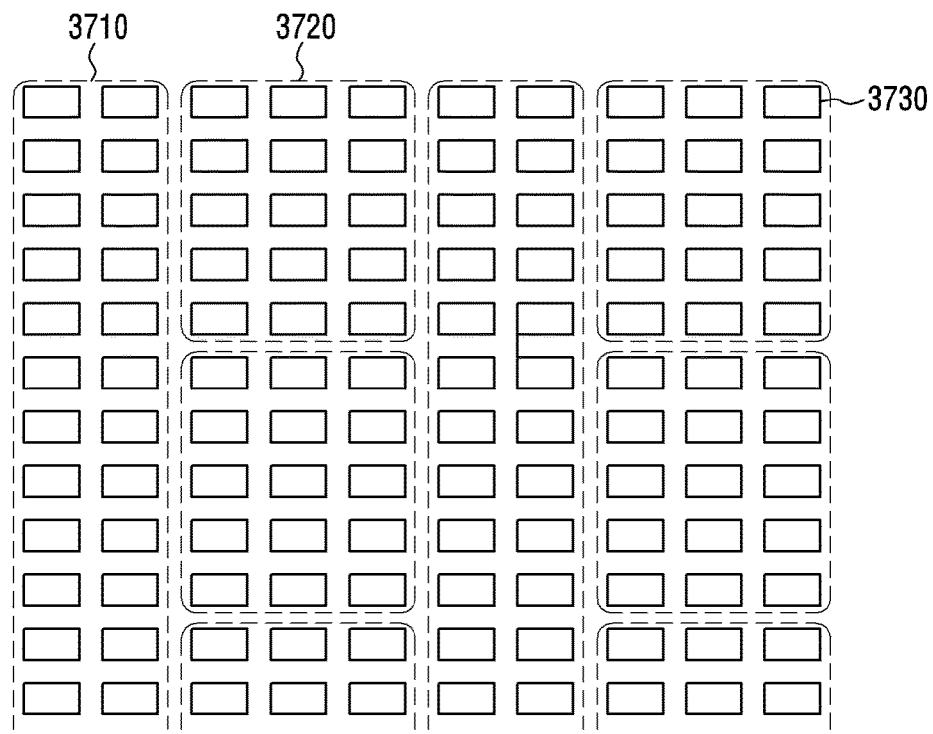

FIGS. 22b and 22c are structure views of touch pressure sensing and touch position sensing of the touch screen according to the fourth embodiment. FIGS. 22b and 22c take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600. More specifically, The TFT substrate layer 3110 may include a column common electrode (column Vcom) 3430, a low common electrode (low Vcom) 3410, and a guard shield electrode 3420. The guard shield electrode 3420 is located between the column common electrode 3430 and the low common electrode 3410 and is able to minimize the interference caused by a fringe field which may be generated between the column common electrode 3430 and the low common electrode 3410. The foregoing description of the LCD panel is apparent to those skilled in the art.

As shown in FIG. 22b, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard shield electrode 3420 and the conductive material layer 3510.

When the display module 3000 shown in FIG. 22b functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, in FIG. 17b, the conductive material layer 3510 functions as the reference potential layer and detects the change of the capacitance between the low common electrode 3410 and the guard shield electrode 3420, so that the touch pressure can be detected.

FIG. 22c shows a structure in which the LCD panel as the display module 3000 is used as the touch position sensing module. The arrangement of the common electrodes 3730 is shown in FIG. 22c. Here, for the purpose of detecting the touch position, these common electrodes 3730 may be divided into a first area 3710 and a second area 3720. Accordingly, for example, the common electrodes 3730 included in one first area 3710 may be operated in such a manner as to function in response to the first electrode 6400 of FIG. 23c, and the common electrodes 3730 included in one second area 3720 may be operated in such a manner as to function in response to the second electrode 6500 of FIG. 23c. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 22, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 22b and 22c only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

Hereafter, a virtual touch pad operation method and a terminal 100 performing the same according to the embodiment of the present invention will be described with reference to the accompanying drawings.

FIG. 1 is a structure view of the terminal 100 according to the embodiment of the present invention. The terminal 100 according to the embodiment of the present invention may include the touch screen 204 and a processor 140.

The terminal 100 according to the embodiment of the present invention may be a portable electronic device like a laptop computer, a personal digital assistant (PDA) and a smartphone.

The touch screen 204 according to the embodiment of the present invention allows a user to operate a computing system by touching the screen by a finger, etc. In general, the touch screen recognizes the touch on the panel, touch position, touch pressure or touch area, then the computing system analyzes the touch and performs operations in accordance with the analysis.

When touch occurs on the touch screen 204, the touch screen 204 according to the embodiment of the present invention is able to detect whether or not the touch occurs, the touch position, touch pressure or touch area.

Although the touch screen 204 according to the embodiment of the present invention is able to recognize a hovering state in which the object like the finger does not touch directly the touch screen 204 and is close enough to the touch screen 204 to cause the change of the capacitance in the touch screen 204. When the object 10 is located within a predetermined distance from the touch screen 204, the existence of the object 10 may be recognized as the hovering. The distance between the touch screen 204 and the object 10 means the length of a perpendicular line from the object 10 to the touch screen 204.

In order that the movement of the object 10 is recognized as hovering over the touch screen 204, it is desirable that the error of a capacitance change amount which is generated at the touch screen 204 by the hovering is larger than that of the capacitance change amount which is generated at the common touch screen 204. The mutual capacitance change amount in the touch screen 204, which is generated during the hovering of the object 10, may be smaller than that of the capacitance change amount of the direct touch on the touch screen 204.

The processor 140 of the terminal 100 according to the embodiment of the present invention may measure the amount of capacitance change occurring according to the touch when the touch occurs on the touch screen 204. Also, the processor 140 may calculate the magnitude of the touch pressure on a touch screen 204 on the basis of the capacitance change amount. Therefore, the processor 140 may detect the capacitance change amount generated at the touch screen 204 and then detect whether the touch or hovering occurs or not and the position of the touch or hovering.

The processor 140 of the terminal 100 according to another embodiment of the present invention may measure the capacitance change amount due to the touch or the pressure magnitude of the touch on the touch screen 204. Also, the processor 140 may calculate the pressure magnitude or area of the touch on the touch screen 204 on the basis of the capacitance change amount.

Figure 2:
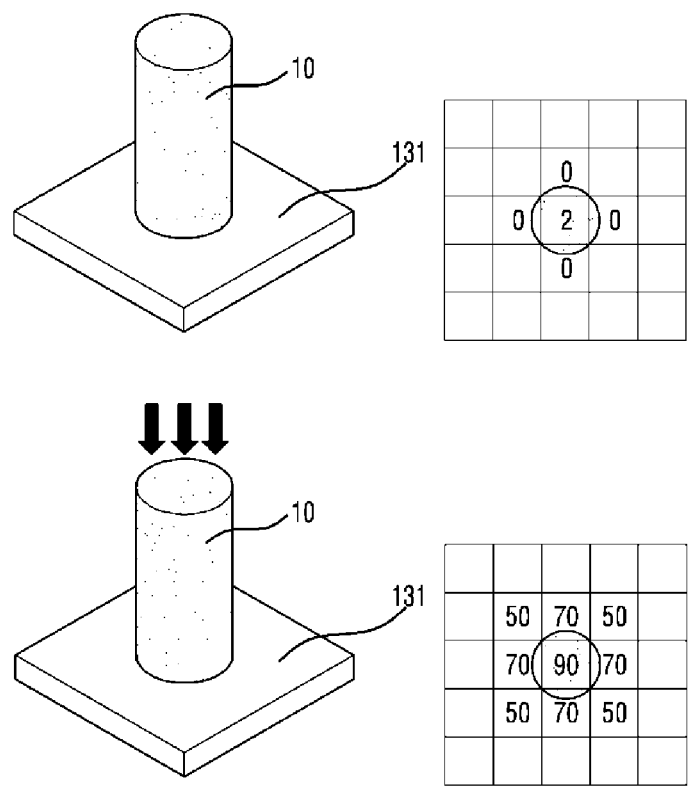
FIG. 2 is a view for describing the capacitance change amount due to pressure.

Specifically, the processor 140 may calculate the magnitude of the touch pressure by summing the capacitance change amounts according to the pressure magnitude of the touch applied to the touch screen 204 by the object 10. For example, as shown in FIG. 2, when a common touch is input to the touch screen 204 by the object 10, the sum of the capacitance change amounts is 2. Also, when the touch with pressure is input to the touch screen 204 by the object 10, the sum of the capacitance change amounts is 570 (=90+70+70+70+70+50+50+50+50).

Figure 3:
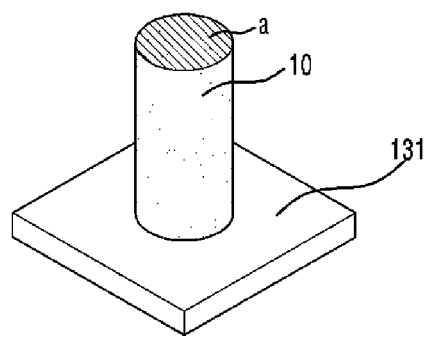
FIG. 3 is a view for describing the capacitance change amount due to the area.
Figure 3:
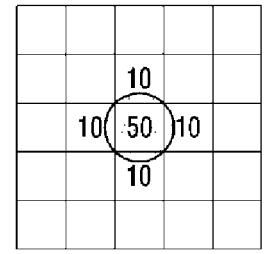
Figure 3:
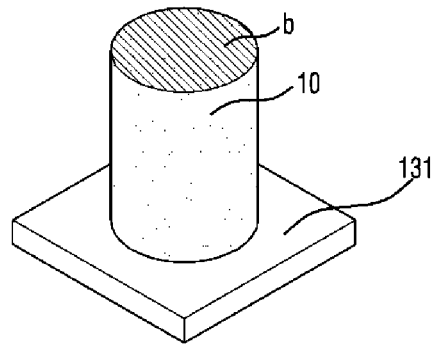
Figure 3:
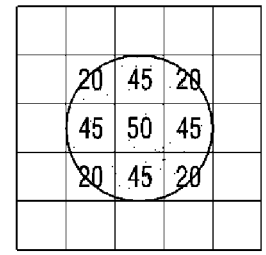

Also, the processor 140 may calculate the touch area by summing the capacitance change amounts according to the area of the object 10 touching the touch screen 204. For example, as shown in FIG. 3, when the area of the object 10 touching the touch screen 204 is "a", the sum of the capacitance change amounts is 90 (=50+10+10+10+10). Also, when the area of the object 10 touching the touch screen 204 is "b", the sum of the capacitance change amounts is 310 (=50+45+45+45+45+20+20+20+20).

When the object 10 is a finger and the touch with pressure occurs on the touch screen 204, the area of the object 10 touching the touch screen 204 is changed simultaneously when the sum of the capacitance change amounts due to the pressure is changed. Therefore, the sum of the capacitance change amounts due to the touch area is also changed.

The terminal 100 according to the embodiment of the present invention may further include a controller 110 and a memory 120.

The controller 110 according to the embodiment of the present invention determines from the processor 140 whether the touch on the touch screen is an input for activating a virtual touch pad or not. When there is an input for the activation of the virtual touch pad, it is possible to activate the virtual touch pad and to control the overall operations of the virtual touch pad. The controller 110 according to the embodiment of the present invention may be an application processor. The application processor is able to perform the command interpretation, operation, and control, etc., in the portable electronic device. The function of the controller 110 according to the embodiment of the present invention will be described in detail later.

The memory 120 may store a program for the activation of the controller 110 or may temporarily store input/output data. For example, the memory 120 according to the embodiment of the present invention may store a touch condition of the touch screen 204 for the purpose of activating the virtual touch pad. Also, the memory 120 may store the operation contents according to the input to the virtual touch pad. The memory 120 may include at least one type of a storage medium selected from the group consisting of a flash memory type, a hard disk type, a multimedia card micro type, a card type memory (e.g., SD or XD memory, etc.), a random access memory (RAM), a static random access memory (SRAM), a read-only memory (ROM), a electrically erasable programmable read-only memory (EEPROM), a programmable read-only memory (PROM), a magnetic memory, a magnetic disc, and an optical disc.

Figure 14:
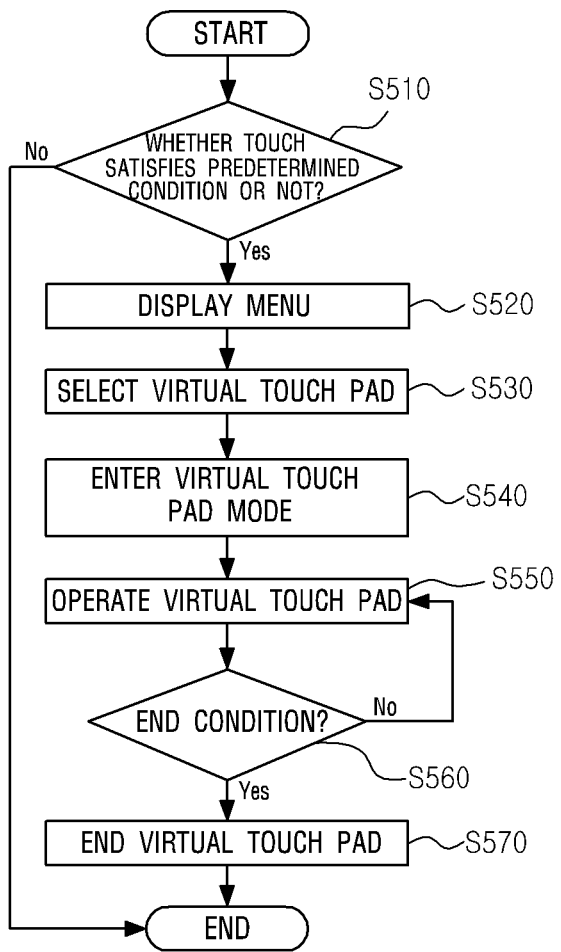
FIG. 14 is a flowchart for describing a process of operating the virtual touch pad according to the embodiment of the present invention.

FIG. 14 is a flowchart for describing a process of operating the virtual touch pad according to the embodiment of the present invention.

Referring to FIG. 14, in the embodiment of the present invention, the process of operating the virtual touch pad may include a step S510 of determining whether or not a signal input to the touch screen corresponds to the hovering or touch which satisfies a predetermined condition, a step S520 of displaying a virtual touch pad menu when it is determined that the signal corresponds to the hovering or touch satisfying the predetermined condition, a step S530 of selecting a virtual touch pad mode, a step S540 of entering the virtual touch pad mode, a step S550 of operating the virtual touch pad, a step S560 of determining an end condition of the virtual touch pad, and a step S570 of ending the virtual touch pad.

Here, the step S520 of displaying the virtual touch pad menu and the step S530 of selecting the virtual touch pad mode may be omitted. Therefore, when there is the hovering input or touch input which satisfies a predetermined condition, it is possible to immediately enter the virtual touch pad mode.

Figure 4:
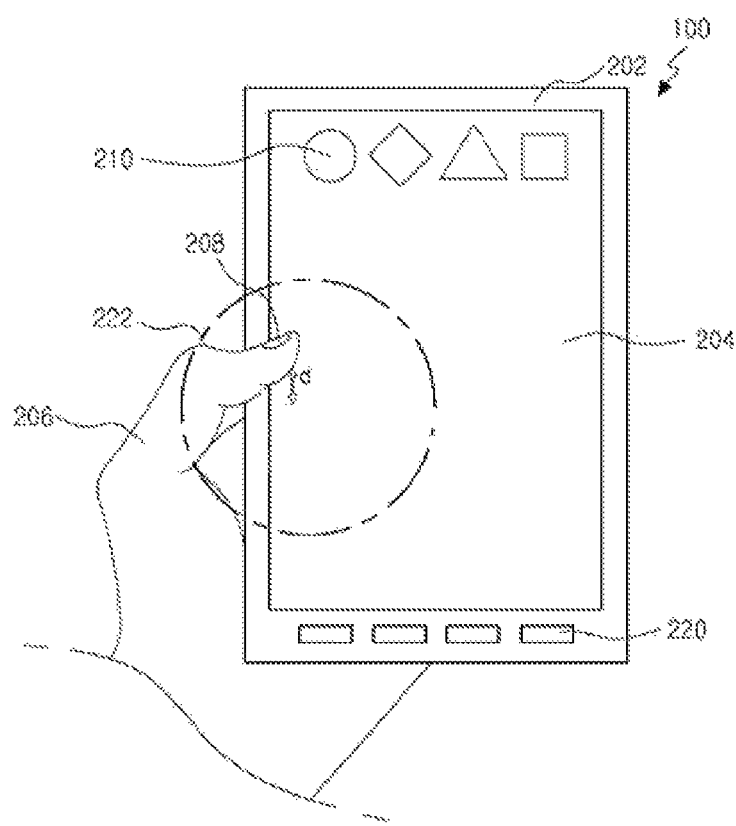
FIGS. 4 and 5 show sequentially an entry step of a virtual touch pad according to the embodiment of the present invention.
Figure 5:
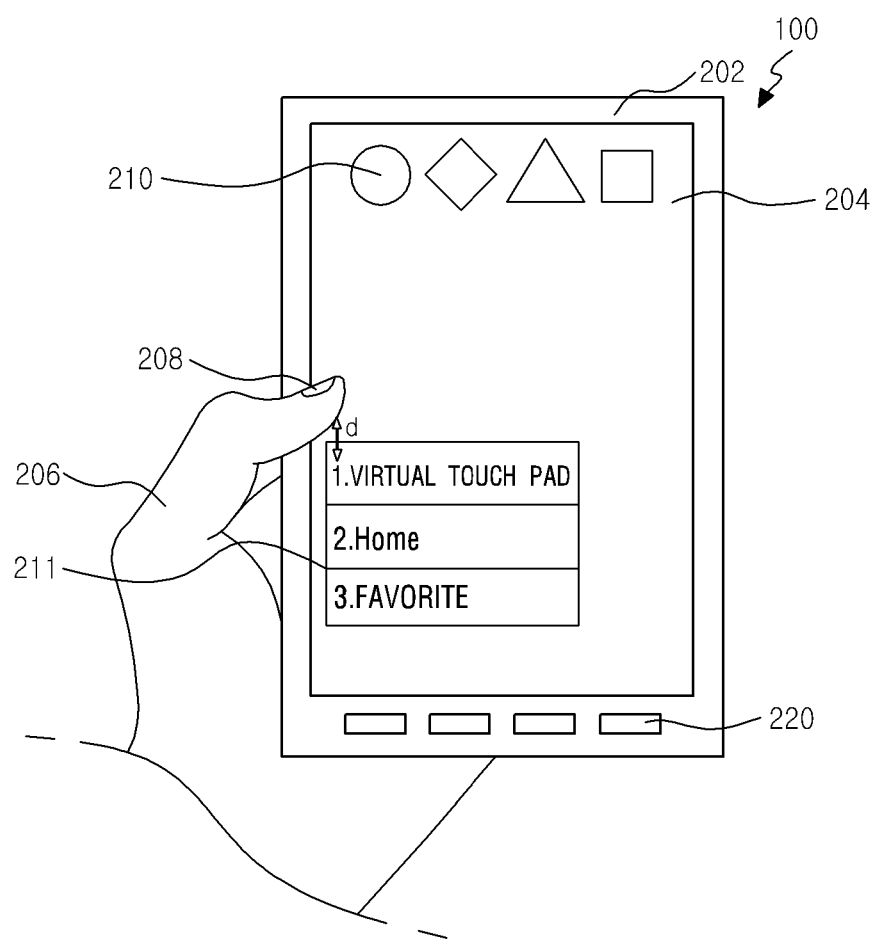

Also, the virtual touch pad is not necessarily displayed on the touch screen 204. It is possible to simply enter the virtual touch pad mode. FIGS. 4 and 5 show sequentially the entry step of the virtual touch pad according to the embodiment of the present invention.

Hereafter, the entry step of the virtual touch pad according to the embodiment of the present invention will be described in detail with reference to FIGS. 4 and 5.

At least one icon 210 is displayed on the touch screen 204 of the terminal 100. Due to the enlargement of the terminal 100, as shown in the drawings, a user has a difficulty in operating the touch screen 204 while holding the terminal 100 by one hand 206. That is, since the icon 210 may be positioned out of reach 222 of thumb 208 of the user, the user cannot touch all of the icons 210 displayed on the touch screen 204 even only by his/her thumb 208 holding the terminal 100. Here, the user may select the icon 210 displayed on the touch screen 204 by using the other hand. However, depending on situations, it may be difficult or impossible for the user to select the icon by using the other hand. This should be improved for the sake of convenience. Here, the icon is a small picture or symbol which is displayed on the touch screen 204. The icon may represent an application which is executed in the terminal 100, file or folder. When the icon is executed by touching, etc., an application corresponding to the icon is executed, or the file or folder may be opened.

The embodiment of the present invention provides a technology of operating the virtual touch pad so as to overcome the inconvenience and problem. The user is able to operate a computing system simply by touching the touch screen 204 according to the embodiment of the present invention by means of his/her finger, etc., or is able to operate a computing system by touching the touch screen 204 by means of an object like a finger, a stylus pen, etc., to the extent to be sensed by the touch screen 204.

The embodiment of the present invention will be described with reference to FIG. 1. A hovering area 170 represents an area between the touch screen 204 and the object 10 such that the existence of the object 10 is recognized as the hovering. The hovering area 170 may represent an area within a predetermined distance "d" from the touch screen 204. When the object 10 is positioned within the hovering area 170 and a predetermined condition is satisfied, the existence of the object 10 may be recognized as the hovering. When the object 10 is positioned out of the hovering area 170, the existence of the object 10 is not recognized as the hovering.

The distance "d" in which the hovering is recognized between the object 10 and the touch screen 204 can be detected not only by the capacitance change amount but also by information on at least one of a video camera, a light level sensor and an ultrasonic sensor.

As shown in FIG. 4, when the hovering or touch on the touch screen 204 meets a predetermined condition, it is possible to enter the virtual touch pad mode.

The predetermined condition may allow the hovering or touch to occur at one position of the touch screen 204 during a time period longer than a predetermined period of time. Specifically, the predetermined condition may be that after the first touch is input to the touch screen 204, the touch is maintained continuously for the predetermined period of time and the position variation of the touch is within a predetermined range.

Regarding the touch input, the predetermined condition may be a predetermined time period or may be that the object touches the touch screen 204 at a pressure greater than a predetermined pressure. For example, the predetermined condition may be that the touch screen 204 is touched, as shown in FIG. 2, with the sum of the capacitance change amounts larger than 570 due to the pressure. Also, the predetermined condition may be that the object touches the touch screen 204 with an area greater than a predetermined area. For example, the predetermined condition may be that the touch screen 204 is touched, as shown in FIG. 3, with the sum of the capacitance change amounts larger than 310 due to the area. Also, the predetermined condition may be that the object touches or hovers over the touch screen 204 to a specific rhythm. For example, the predetermined condition may be that the finger 208 touches continuously the touch screen 204 twice.

Regarding the hovering input or the touch input, the predetermined condition may be a predetermined time period or may be that the object touches the touch screen 204 in a particular pattern. For example, the predetermined condition may be that the finger 208 touches the touch screen 204 in a heart-shaped pattern. Also, the predetermined condition may be that the finger 208 drags on a particular position of the touch screen 204. For example, the predetermined condition may be that the finger 208 touches the outer portion of the touch screen 204, and then drags to the inner portion of the touch screen 204.

Here, the predetermined conditions may be combined with each other. For example, the predetermined condition may be that the finger 208 touches continuously the touch screen 204 twice and the second touch occurs at a pressure greater than a predetermined pressure or with an area greater than a predetermined area. Here, the first touch may occur at a pressure less than a predetermined pressure or with an area less than a predetermined area.

Accordingly, the condition that the object hovers over or touches one position of the touch screen 204 during a time period longer than a predetermined period of time, the condition that the object touches at a pressure greater than a predetermined pressure, the condition that the object touches with an area greater than a predetermined area, the condition that the object hovers over or touches in a particular pattern, the condition that the object hovers over or drags at a particular position, and the condition that the object hovers over or touches to a specific rhythm may be combined with each other.

Here, when the object hovers over or touches one position of the touch screen 204 during a time period longer than a predetermined period of time, it takes a predetermined time period for the user to enter the virtual touch pad mode. Regarding the condition that the object hovers over or touches in a particular pattern, the condition that the object hovers over or drags at a particular position, and the condition that the object hovers over or touches to a specific rhythm, it also takes a predetermined time period for the user to enter the virtual touch pad mode. Contrary to this, in entering the virtual touch pad mode according to the touch pressure magnitude or touch area, the user controls the pressure magnitude or area of the touch input for entering the virtual touch pad mode, so that less time is required.

Here, in entering the virtual touch pad mode in accordance with the touch area, it is possible to enter the virtual touch pad mode according to the embodiment of the present invention even without hardware which detects the touch pressure. Meanwhile, in entering the virtual touch pad mode in accordance with the touch pressure magnitude, The predetermined conditions may be stored in the memory 120. The controller 110 makes reference to the memory 120, and then determines whether the input to the touch screen 204 meets the predetermined condition or not.

When the input to the touch screen 204 meets the predetermined condition, the controller 110 controls such that it is possible to immediately enter the virtual touch pad mode.

Otherwise, when the input to the touch screen 204 meets the predetermined condition, the controller 110 controls the virtual touch pad menu 211 to be displayed as shown in FIG. 5.

For example, when the virtual touch pad menu 211 is displayed on the touch screen 204, the user is allowed to enter one of various modes displayed on the virtual touch pad menu 211, for example, the virtual touch pad mode, home mode and favorite mode.

Figure 6:
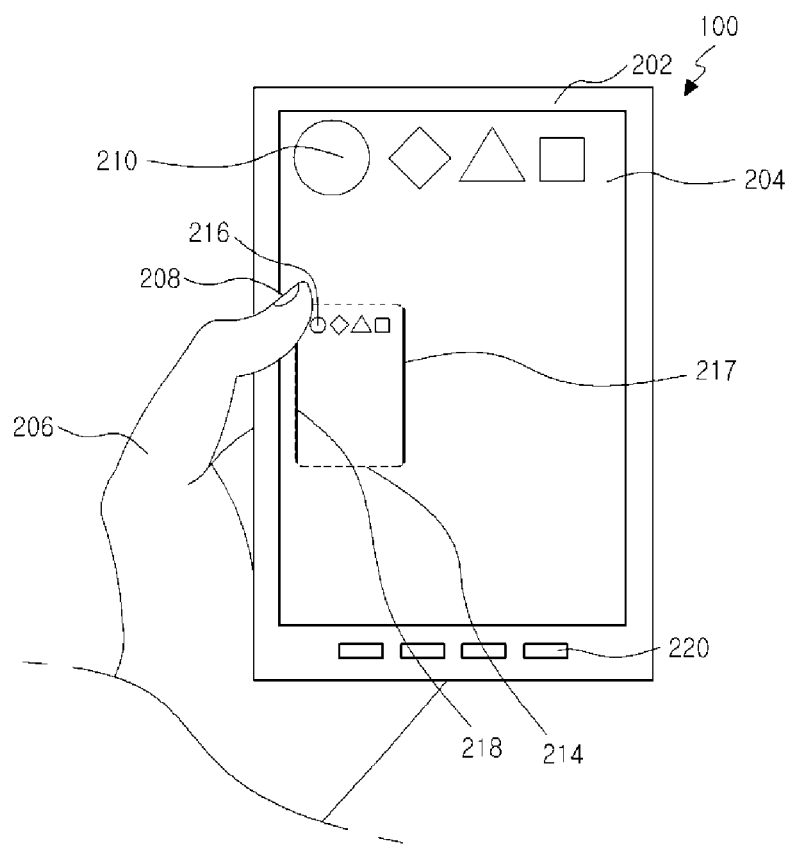
FIGS. 6 and 7 show sequentially an operation mode of the virtual touch pad according to a first embodiment of the present invention.
Figure 7:
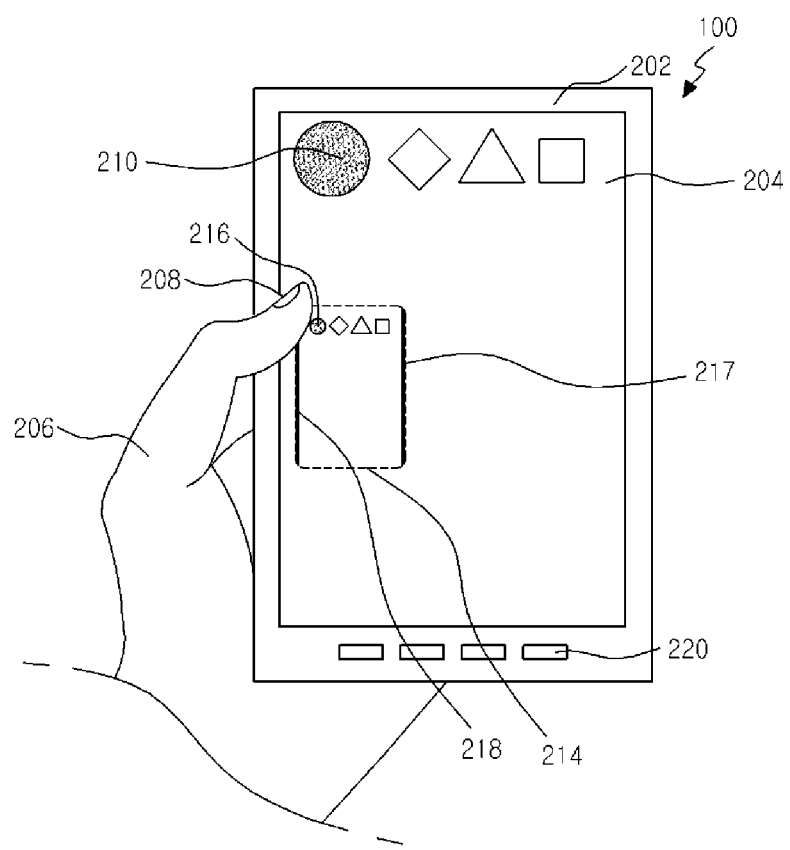

The position where the virtual touch pad menu 211 is displayed or the position where the virtual touch pad 214 is formed may be determined considering the reach 222 of the thumb on the basis of the position where the hovering or touch of the user has been detected. Specifically, when the left hand of the user hovers over or touches the touch screen, the position where the first hovering or the first touch has been detected is generally located to the left of the vertical central axis of the touch screen 204. Thus, it is preferable that the position where the virtual touch pad menu 211 is displayed or the position where the virtual touch pad 214 is formed is the left side of the touch screen 204 in terms of convenience. Likewise, when the right hand of the user hovers over or touches the touch screen, it is preferable that the position where the virtual touch pad 214 is formed is the right side of the touch screen 204 in terms of convenience. Otherwise, the position where the virtual touch pad menu 211 is displayed or the position where the virtual touch pad 214 is formed may be directly selected by the user through a separate operation. For example, the user hovers over and then drags on or touches and then drags on a specific area of the virtual touch pad menu 211 or a specific area of the virtual touch pad 214, so that the position where the virtual touch pad menu 211 is displayed or the position where the virtual touch pad 214 is formed can be selected according to the user's favorite position. FIGS. 6 and 7 show sequentially an operation mode of the virtual touch pad according to the first embodiment of the present invention. When the virtual touch pad mode is selected, the virtual touch pad 214 may be, as shown in FIG. 6, formed in a portion of the touch screen 204. The virtual touch pad 214 may not be displayed on the touch screen 204. When the virtual touch pad 214 is displayed, the image including the icon 210 displayed on the touch screen 204 may be reduced and displayed on the virtual touch pad 214. In other words, the virtual touch pad 214 corresponds to the reduced touch screen 204, and the reduced icon 216 may be displayed. Thus, the selected icon 210 may be executed by selecting the reduced icon 216 which is displayed on the virtual touch pad 214.

The reduced icon 216 may be selected by the hovering or the touch with a pressure less than a predetermined pressure or with an area less than a predetermined area.

As described above, the icon 216 may be selected by the hovering. Specifically, when the user's finger 208 hovers over a reduced circular icon of the virtual touch pad 214, it can be indicated that the circular icon has been temporarily selected in such manners that the circular icon of the touch screen 204 becomes larger than the other icons, or that the outline of the circular icon becomes thicker, or that the circular icon is indicated by a different color. As shown in FIG. 7, when the user's finger hovers over the circular icon of the virtual touch pad 214, the color of the circular icon is changed so as to indicate that the circular icon has been temporarily selected. Here, the temporary selection may be reflected in only the virtual touch pad 214, or in only the touch screen 204 itself, or in both the virtual touch pad 214 and the touch screen 204. FIG. 7 shows that the temporary selection has been reflected to both of the entire virtual touch pad 214 and the touch screen 204.

As described above, the icon 216 may be selected by the touch. For example, when the sum of the capacitance change amounts due to the pressure is less than 100 or when the sum of the capacitance change amounts due to the touch area is less than 100, the input touch is recognized as a touch with a pressure less than a predetermined pressure or with an area less than a predetermined area.

Specifically, when the user's finger 208 touches the reduced icon 216 of the virtual touch pad 214 with a pressure less than a predetermined pressure or with an area less than a predetermined area, the icon 210 of the touch screen 204, which corresponds to the reduced icon 216 of the virtual touch pad 214, to which the touch has been input, is selected and it can be indicated that the icon 210 has been selected in such a manner that the size, outline thickness or color of the icon 210 is changed.

As shown in FIG. 7, when the finger selects the circular icon displayed on the virtual touch pad 214, the color of the circular icon is changed so as to indicate that the circular icon has been selected. Here, the selection of the icon 216 may be displayed in only the virtual touch pad 214, or in only the touch screen 204 itself, or in both the virtual touch pad 214 and the touch screen 204. FIG. 7 shows that the selection of the icon 216 has been displayed to both of the virtual touch pad 214 and the touch screen 204.

The selection or execution of the icon 210 may be made by the touch with a pressure greater than a predetermined pressure or with an area greater than a predetermined area. For example, when the sum of the capacitance change amounts due to the pressure is greater than 100 or when the sum of the capacitance change amounts due to the touch area is greater than 100, the input touch is recognized as a touch with a pressure greater than a predetermined pressure or with an area greater than a predetermined area.

In the state where the icon 210 has been selected, the user touches the virtual touch pad 214 with a pressure greater than a predetermined pressure or with an area greater than a predetermined area, thereby executing the corresponding icon 210.

The result of the execution of the icon 216 on the virtual touch pad 214 may be displayed on the entire touch screen 204. Also, the result may be displayed on the virtual touch pad 214. Therefore, even when the icon 216 is executed, the user is able to operate the terminal 100 through the virtual touch pad 214.

Figure 8:
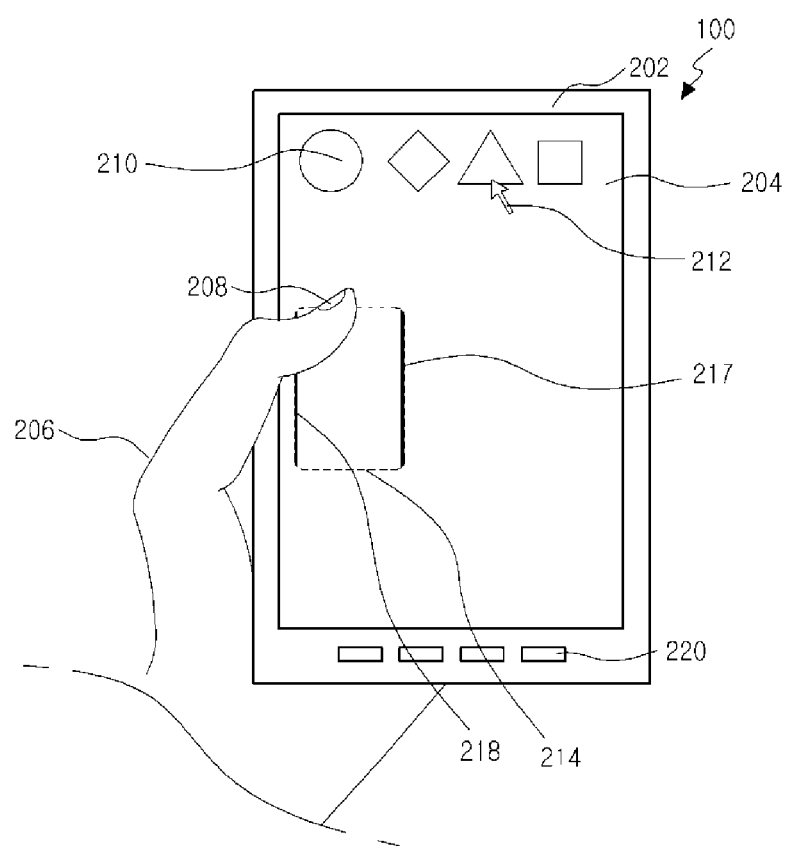
FIGS. 8 and 9 show sequentially an operation mode of the virtual touch pad according to a second embodiment of the present invention.
Figure 9:
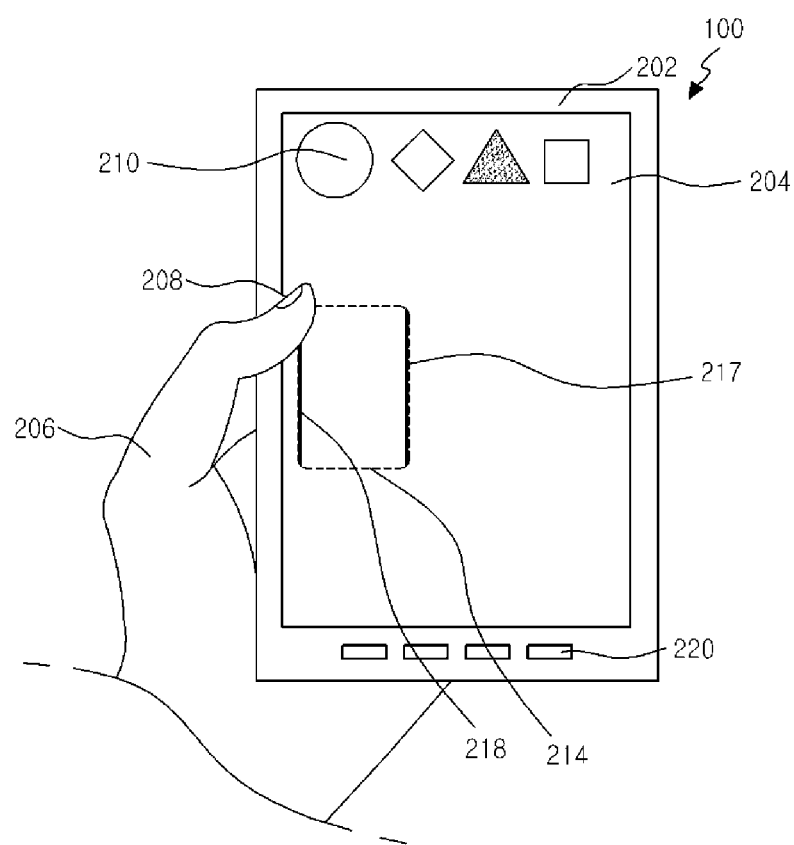

As described above, it is possible to operate the virtual touch pad 214 by the hovering and the touch which is distinguished according to the touch pressure magnitude or touch area, and to select and execute the icon 210 on the touch screen 204, which corresponds to the operation of the virtual touch pad 214. FIGS. 8 and 9 show sequentially an operation mode of the virtual touch pad according to the second embodiment of the present invention. As shown in FIG. 8, the virtual touch pad 214 according to the second embodiment of the present invention does not have a reduced form of the entire touch screen 204. Therefore, in the second embodiment of the present invention, the icon 210 on the touch screen 204 may not be displayed in the reduced form thereof on the virtual touch pad 214.

As shown in FIG. 8, in the second embodiment of the present invention, when the user enters the virtual touch pad mode, a pointer 212 together with the virtual touch pad 214 may be displayed on the touch screen 204. Here, the user may change the position of the pointer 212 on the touch screen 204 by changing the position of the hovering over the virtual touch pad 214. Also, the touch with a pressure less than a predetermined pressure or with an area less than a predetermined area is input and the position of the touch is changed, so that the position of the pointer 212 on the touch screen 204 can be changed. Here, it can be indicated that the icon 210 pointed by the pointer 212 has been selected in such a manner that the size, outline thickness or color of the icon 210 is changed. In the state where the icon 210 has been selected by the pointer 212, the user touches the virtual touch pad 214 with a pressure greater than a predetermined pressure or with an area greater than a predetermined area, thereby executing the corresponding icon 210.

Also, without displaying the pointer according to the second embodiment, it can be indicated that the icon 210 has been selected in such a manner that the size, outline thickness or color of the icon 210 on the touch screen 204, which corresponds to the position of the touch which has a pressure less than a predetermined pressure or an area less than a predetermined area and has been input to the virtual touch pad 214, is changed.

As shown in FIG. 9, when the user tries to select a triangular icon, the touch with a pressure less than a predetermined pressure or with an area less than a predetermined area is input to the virtual touch pad 214, and the position of the touch input to the virtual touch pad 214 is changed such that the triangular icon of the touch screen 204 is selected. Here, it can be indicated that the triangular icon has been selected in such a manner that the color of the triangular icon is changed.

The pointer is not displayed in FIG. 9. Therefore, through the change of the size, outline thickness or color of the icon 210 on the touch screen 204, which corresponds to the position of the touch which has a pressure less than a predetermined pressure or an area less than a predetermined area and has been input to the virtual touch pad 214, it is possible to recognize which icon has been selected.

As shown in FIG. 9, when the user wants to select a quadrangular icon in the state where the triangular icon has been selected, the touch with a pressure less than a predetermined pressure or with an area less than a predetermined area can be input by moving the finger to the right on the virtual touch pad 214. Here, when the position of the touch which is input to the virtual touch pad 214 corresponds to the position of the quadrangular icon on the touch screen 214, the quadrangular icon is selected and the selection of the quadrangular icon may be displayed on the touch screen 204.

In the state where the icon 210 has been selected, the user may execute the corresponding icon 210 by inputting a direct touch, i.e., the touch with a pressure greater than a predetermined pressure or with an area greater than a predetermined area to the virtual touch pad 214.

Here, the operation of the virtual touch pad 214 of the terminal 100 according to the first and the second embodiments is to separate the virtual touch pad 214 from the object which has hovered over or touched the virtual touch pad 214. The virtual touch pad 214 can be operated by releasing the hovering or touch input to the virtual touch pad 214.

Specifically, the user selects a desired icon 210 by touching the virtual touch pad 214 with the finger 208, and then may execute the icon 210 by releasing the input touch. Here, when the selected icon 210 is not the desired icon, the user selects the desired icon by sliding the finger 208 which has touched the virtual touch pad 214, and then may execute the desired icon by releasing the input touch.

Also, through one touch according to the embodiment, it is possible to enter the virtual touch pad mode, to select the icon and to execute the icon. For example, when the touch input meets a predetermined condition, the user is allowed to enter the virtual touch pad mode. Here, the user slides the corresponding touch without releasing the touch and selects the desired icon corresponding to the position of the slid touch, and then releases the touch and executes the corresponding icon.

Here, when there is no icon which corresponds to the position of the touch which has slid, the selection before sliding may be released.

Figure 10:
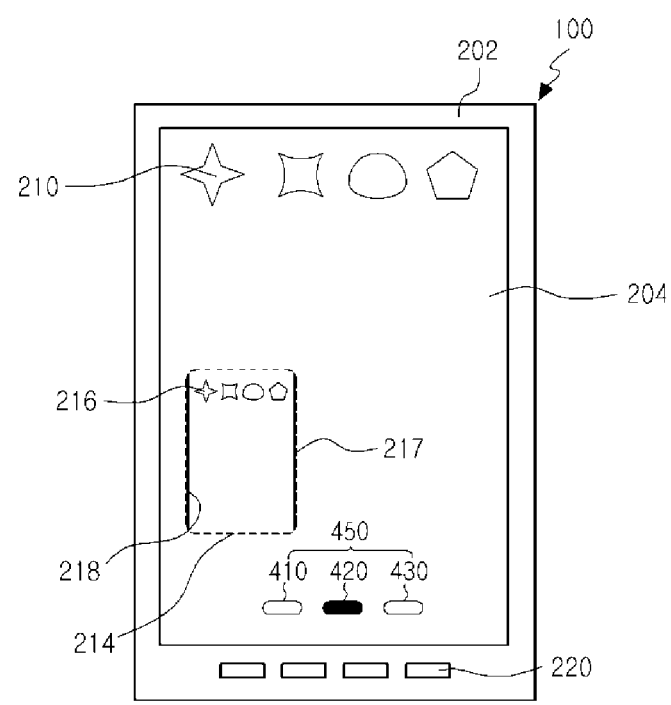
FIGS. 10 and 11 show sequentially an operation mode of the virtual touch pad according to a third embodiment of the present invention.
Figure 11:
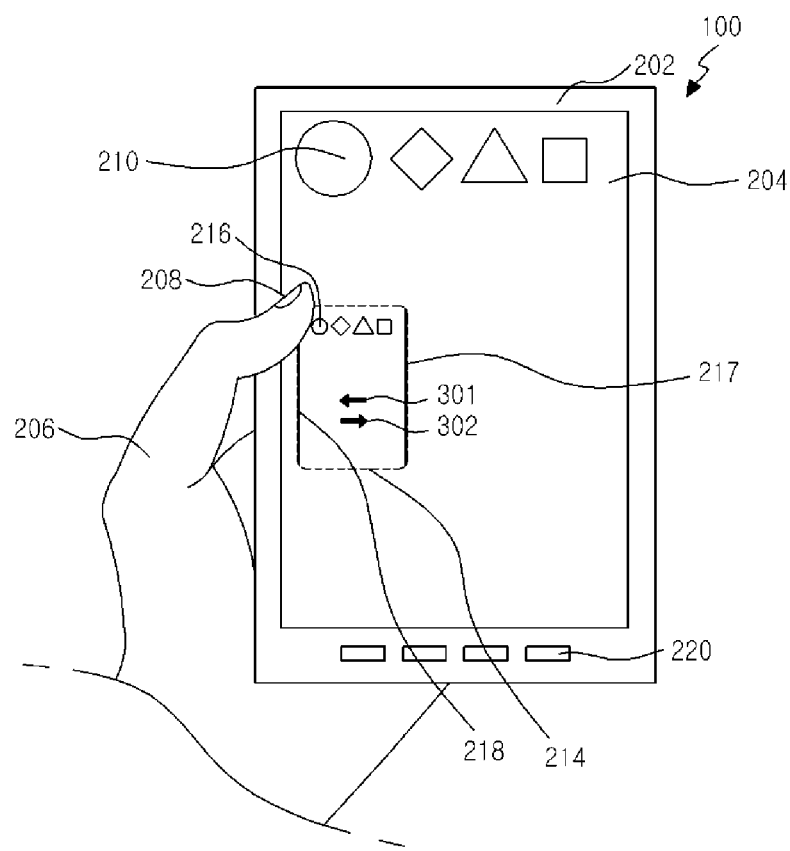

FIGS. 8 and 9 show that the virtual touch pad 214 is clearly displayed on the touch screen 204. However, this is just an example. The virtual touch pad 214 is not necessarily displayed on the touch screen 204. It is enough as long as the user recognizes, through a predetermined feedback, that the virtual touch pad mode is being performed and/or whether the touch occurs on an area where the virtual touch pad mode is being performed. For example, the performance of the virtual touch pad mode is may be displayed on the screen in the form of characters. When the touch occurs on the virtual touch pad mode area, a tactual feel at the time of touching the touch screen 204 may be set to be different from the tactual feel at the time of touching the common touch screen 204. FIGS. 10 and 11 show sequentially an operation mode of the virtual touch pad according to the third embodiment of the present invention. When the number of the icons 210 which are displayed on the touch screen 204 is greater than the number of the icons which can be displayed on one page, the icons may be distributed on a plurality of pages.

In the third embodiment, a page index 450 indicating the position of the page may include a first page index 410, a second page index 420, and a third page index 430. The number of the pages may be changed according to setting.

As shown in FIG. 10, it can be seen that a second page has been displayed on the touch screen 204 by the second page index 420. That is, the second page index 420 indicating that the second page has been displayed on the touch screen 204 is indicated by a color different from those of the first page index 410 indicating a first page which is not displayed and the third page index 430 indicating a third page which is not displayed. Accordingly, it can be found that the second page is currently displayed on the screen.

When it is intended to move to another page of the screen 204, the page may be moved by inputting the touch to a sidebar of the virtual touch pad 214. Here, the sidebar may include a right sidebar 217 disposed on the right of the virtual touch pad 214 or a left sidebar 218 disposed on the left of the virtual touch pad 214.

Specifically, when it is intended to move from the currently displayed second page to the third page, the user is able to move to the third page by touching the right sidebar 217 or by hovering over the right sidebar 217 during a certain period of time.

Also, the user slides the object which has hovered over or touched an area other than the right sidebar 217 and the left sidebar 218 of the virtual touch pad 214 such that the object is located in the right sidebar 217 or the left sidebar 218, releases the input hovering or touch, and thus, moves the page.

When the current page is the first page, the page does not move any more even by inputting the hovering or touch to the left sidebar 218, and then the left sidebar 218 and/or a portion of the touch screen 204, which corresponds to the left sidebar 218 become brighter, thereby notifying that the current page is the first page.

Also, when the current page is the last page, the page does not move any more even by inputting the hovering or touch to the right sidebar 217, and then the right sidebar 217 and/or a portion of the touch screen 204, which corresponds to the right sidebar 217 become brighter, thereby notifying that the current page is the last page.

Figure 12:
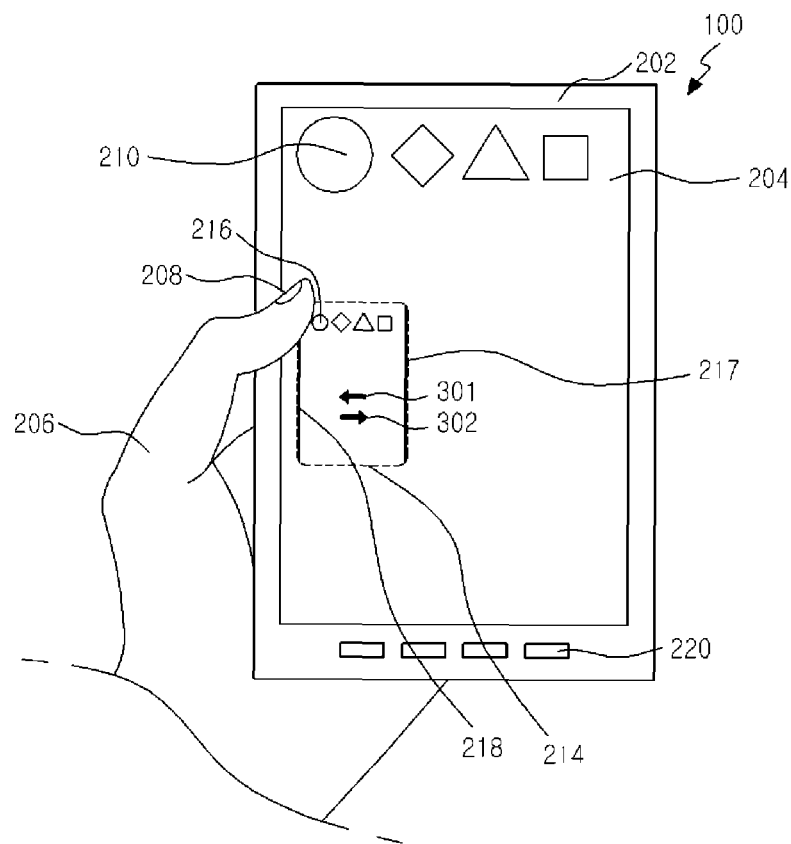
FIG. 12 shows a method of ending the mode of the virtual touch pad according to the embodiment of the present invention.

As shown in FIG. 11, the user is able to move the page simply by sliding in a first direction 301 or a second direction 302 the finger 208 which has touched the virtual touch pad 214. In other words, on the virtual touch pad 214, the user is able to move to the next page by causing the finger 208 which has touched to move at a predetermined speed in the first direction 301 (for example, to the page 430 when the current page is 420). Also, on the virtual touch pad 214, the user is able to move to the previous page by causing the finger 208 which has hovered over or touched to move at a predetermined speed in the second direction 302 (for example, to the page 420 when the current page is 410). Here, in a direction relationship between the touch screen 204 and both the first direction 301 and the second direction 302, the first direction 301 and the second direction 302 may be intuitively determined as a page-turning direction. For example, when the touch screen 204 is held by the user as shown in FIG. 11, the first direction 301 and the second direction 302 may be determined as the left direction and the right direction respectively on the basis of FIG. 11. Also, when the touch screen shown in FIG. 11 is rotated clockwise at 90 degrees and used by the user, the first direction 301 and the second direction 302 may be determined as a downward direction and an upward direction respectively on the basis of the touch screen 204 of FIG. 11. FIG. 12 shows a method of ending the mode of the virtual touch pad according to the embodiment of the present invention. As shown in FIG. 12, the virtual touch pad mode can be ended by hovering over an end mark 303 located in or outside the virtual touch pad 214 for a predetermined period of time or by causing the end mark to be touched with a pressure greater than a predetermined pressure or with an area greater than a predetermined area for a predetermined period of time.

Also, the virtual touch pad mode can be ended by sliding the object which has hovered over or has touched the virtual touch pad 214 to the end mark 303 and then by releasing the hovering or touch.

This is just an example. The virtual touch pad mode can be ended by executing the icon. Also, the virtual touch pad mode can be ended by hovering over an area outside the virtual touch pad 214 or by causing the area outside the virtual touch pad 214 to be touched with a pressure greater than a predetermined pressure (or with an area greater than a predetermined area), or by positioning the object which has hovered over or touched the virtual touch pad 214 to the area outside the virtual touch pad 214 and then by releasing the input hovering or touch. Also, the virtual touch pad mode can be ended even only by moving the touch input to the virtual touch pad 214 to the area outside the virtual touch pad 214. Also, the virtual touch pad mode can be ended when there is no input during a time period longer than a certain period of time (e.g., 10 seconds) after entering the virtual touch pad mode. Also, the virtual touch pad mode can be ended by releasing the touch input to the virtual touch pad without selecting the icon, after entering the virtual touch pad mode through the touch input meeting the predetermined condition. This can be accomplished by at least one selected from among the aforementioned methods, depending on the user's convenience.

Figure 13:
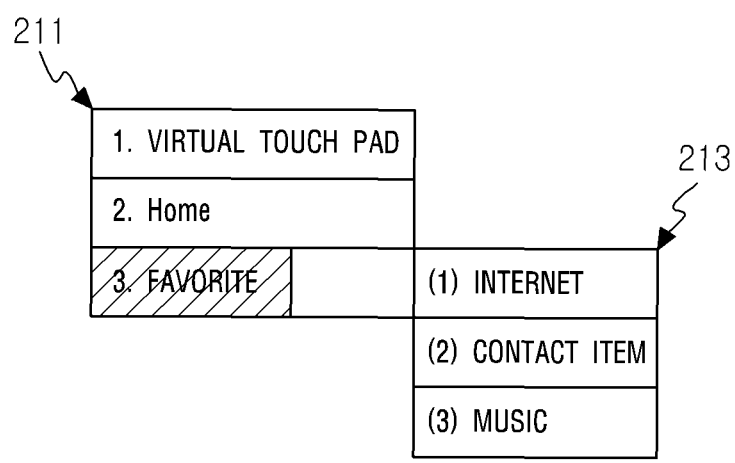
FIG. 13 shows an example of a menu display and a menu selection method in accordance with the embodiment of the present invention.

FIG. 13 shows an example of a menu display and a menu selection method in accordance with the embodiment of the present invention. The virtual touch pad menu 211 may include items corresponding to the home mode and favorite mode as well as an item corresponding to the virtual touch pad mode. This may be changed according to the user's setting. The user is able to enter the favorite mode by hovering over an area where the item corresponding to the favorite mode is displayed or by causing the area where the item corresponding to the favorite mode is displayed to be touched with a pressure greater than a predetermined pressure (or with an area greater than a predetermined area).

When the user enters the favorite mode, a predetermined sub-menu 213 of the favorite mode may be displayed on one side, for example, the right side of the area where the item corresponding to the favorite mode is displayed. Although an internet item, contact item and music item have been set as the sub-menu of the favorite mode, this may be changed according to the user's setting.

The user hovers over the predetermined sub-menu 213 of the favorite mode or touches the predetermined sub-menu 213 of the favorite mode with a pressure greater than a predetermined pressure (or with an area greater than a predetermined area), thereby performing a desired item in the sub-menu 213.

Also, the user slides the object, which has hovered over or touched, to an area where an item corresponding to a desired mode in the virtual touch pad menu 211 is displayed and releases the hovering or touch input to the area, so that the user may enter the desired mode.

As shown in FIG. 13, the item corresponding to the favorite mode may be included and displayed in the virtual touch pad menu 211 or may be displayed on another window. The foregoing has described that the virtual touch pad mode is performed in a state where a specific application is not executed on the touch screen 204 of the terminal 100. However, this is just an example. Even when the execution of the application is displayed on the specific touch screen 204, the application being executed can be operated through the virtual touch pad by entering the virtual touch pad mode according to the embodiment of the present invention. That is, in the virtual touch pad mode according to the embodiment of the present invention, the touch screen 204 can be easily operated through the virtual touch pad by entering the virtual touch pad mode, irrespective of the application which is executed by the terminal 100. As described above, through use of the virtual touch pad 214 in the terminal 100 according to the embodiment, the user is allowed to operate the icon 210 located in a position out of reach of the finger 208 of the user. The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A virtual touch pad operation method comprising:
    determining whether a pressure touch input by an object to a position of a touch screen meets a predetermined condition;
    entering a virtual touch pad mode when the pressure touch input meets the predetermined condition; and
    operating the virtual touch pad,
    wherein the predetermined condition includes a condition that the object touches the touch screen at a pressure greater than a predetermined pressure and
    wherein, in the virtual touch pad mode, the virtual touch pad is displayed on the touch screen.

2. The virtual touch pad operation method of claim 1, wherein, the predetermined condition further includes at least one of a condition that the object touches the touch screen during a time period longer than a predetermined period of time, a condition that the object touches the touch screen with an area greater than a predetermined area, a condition that the object touches the touch screen in a particular pattern, a condition that the object drags on a particular position of the touch screen, and a condition that the object touches the touch screen to a specific rhythm.

3. The virtual touch pad operation method of claim 1, wherein the entering the virtual touch pad mode is performed by displaying a virtual touch pad menu on the touch screen in response to the pressure touch input, by hovering over or touching the virtual touch pad mode on the virtual touch pad menu, or by releasing the hovering or the touching of the virtual touch pad mode on the virtual touch pad menu.

4. The virtual touch pad operation method of claim 1, wherein, in the entering the virtual touch pad mode, an icon displayed on the touch screen is reduced and displayed on the virtual touch pad.

5. The virtual touch pad operation method of claim 1, wherein, in the operating the virtual touch pad, a touch with a pressure less than a predetermined pressure or with an area less than a predetermined area is input to the virtual touch pad, so that an icon is selected which corresponds to the position of the input touch with a pressure less than a predetermined pressure or with an area less than a predetermined area.

6. The virtual touch pad operation method of claim 2, wherein, in the operating the virtual touch pad, the input touch slides and an icon is selected which corresponds to the position of the touch.

7. The virtual touch pad operation method of claim 1, wherein, in the operating the virtual touch pad, the position of a pointer on the touch screen is changed according to the change of the position of a hovering on the virtual touch pad.

8. The virtual touch pad operation method of claim 1, wherein, when an icon displayed on the virtual touch pad is selected, the operating the virtual touch pad comprises displaying that the icon has been selected on the virtual touch pad or on the touch screen.

9. The virtual touch pad operation method of claim 1, wherein, in the operating the virtual touch pad, a pointer is displayed on the touch screen, the position of the pointer on the touch screen is changed according to the change of the position of the touch which has a pressure less than a predetermined pressure or an area less than a predetermined area and has been input to the virtual touch pad.

10. The virtual touch pad operation method of claim 1, wherein, in the operating the virtual touch pad, an icon which is displayed on the virtual touch pad is touched, so that the selected icon is executed.

11. The virtual touch pad operation method of claim 5, wherein, in the operating the virtual touch pad, the pressure touch input to the virtual touch pad is released, so that the selected icon is executed.

12. The virtual touch pad operation method of claim 6, wherein, in the operating the virtual touch pad, the pressure touch input to the virtual touch pad is released, so that the selected icon is executed.

13. The virtual touch pad operation method of claim 1, wherein the operating the virtual touch pad comprises moving a page of the touch screen by hovering over or touching a sidebar disposed on the virtual touch pad or by releasing the hovering or the pressure touch input to the sidebar disposed on the virtual touch pad.

14. The virtual touch pad operation method of claim 1, wherein the operating the virtual touch pad comprises moving a page of the touch screen by sliding an object which has hovered over or touched the virtual touch pad in a predetermined direction.

15. The virtual touch pad operation method of claim 1, further comprising ending the virtual touch pad, wherein the ending the virtual touch pad is performed by selecting an end mark displayed on the touch screen by hovering over or touching the end mark, by releasing the hovering or the pressure touch input to the end mark displayed on the touch screen, by executing an icon, by moving the pressure touch input to the virtual touch pad to an area outside the virtual touch pad, or by releasing the pressure touch input to the virtual touch pad without selecting the icon.

16. A terminal comprising:
    a touch screen; and
    a controller which determines whether a pressure touch input by an object to a position of the touch screen meets a predetermined condition, enters a virtual touch pad mode when the pressure touch input meets the predetermined condition, and operates the virtual touch pad, wherein the predetermined condition includes a condition that the object touches the touch screen at a pressure greater than a predetermined pressure, and wherein, in the virtual touch pad mode, the virtual touch pad is displayed on the touch screen.

17. A virtual touch pad operation method comprising:
determining whether a hovering input by an object to a position of a touch screen meets a predetermined condition;
entering a virtual touch pad mode when the hovering input meets the predetermined condition; and
operating the virtual touch pad,
wherein the predetermined condition is a condition that the object hovers over the touch screen during a time period longer than a predetermined period of time, and
wherein, in the virtual touch pad mode, the virtual touch pad is displayed on the touch screen.

18. The virtual touch pad operation method of claim 17, wherein the entering the virtual touch pad mode is performed by displaying a virtual touch pad menu on the touch screen in response to the hovering input, by hovering over or touching the virtual touch pad mode on the virtual touch pad menu, or by releasing the hovering or the touching to the virtual touch pad mode on the virtual touch pad menu.

19. The virtual touch pad operation method of claim 17, wherein, in the entering the virtual touch pad mode, an icon displayed on the touch screen is reduced and displayed on the virtual touch pad.

20. The virtual touch pad operation method of claim 17, wherein, in the operating the virtual touch pad, a touch with a pressure less than a predetermined pressure or with an area less than a predetermined area is input to the virtual touch pad, so that an icon is selected which corresponds to the position of the input touch with a pressure less than a predetermined pressure or with an area less than a predetermined area.

21. The virtual touch pad operation method of claim 17, wherein, in the operating the virtual touch pad, the input touch slides and an icon is selected which corresponds to the position of the touch.

22. The virtual touch pad operation method of claim 17, wherein, in the operating the virtual touch pad, the position of a pointer on the touch screen is changed according to the change of the position of the hovering on the virtual touch pad.

23. The virtual touch pad operation method of claim 17, wherein, when an icon displayed on the virtual touch pad is selected, the operating the virtual touch pad comprises displaying that the icon has been selected on the virtual touch pad or on the touch screen.

24. The virtual touch pad operation method of claim 17, wherein, in the operating the virtual touch pad, a pointer is displayed on the touch screen, the position of a pointer on the touch screen is changed according to the change of the position of the touch which has a pressure less than a predetermined pressure or an area less than a predetermined area and has been input to the virtual touch pad.

25. The virtual touch pad operation method of claim 17, wherein, in the operating the virtual touch pad, an icon which is displayed on the virtual touch pad is touched, so that the selected icon is executed.

26. The virtual touch pad operation method of claim 20, wherein, in the operating the virtual touch pad, the hovering input to the virtual touch pad is released, so that the selected icon is executed.

27. The virtual touch pad operation method of claim 20, wherein, in the operating the virtual touch pad, the hovering input to the virtual touch pad is released, so that the selected icon is executed.

28. The virtual touch pad operation method of claim 21, wherein the operating the virtual touch pad comprises moving a page of the touch screen by hovering over or touching a sidebar disposed on the virtual touch pad or by releasing the hovering or the touch input to the sidebar disposed on the virtual touch pad.

29. The virtual touch pad operation method of claim 17, wherein the operating the virtual touch pad comprises moving a page of the touch screen by sliding an object which has hovered over or touched the virtual touch pad in a predetermined direction.

30. The virtual touch pad operation method of claim 17, further comprising ending the virtual touch pad, wherein the ending the virtual touch pad is performed by selecting an end mark displayed on the touch screen by hovering over or touching the end mark, by releasing the hovering or the pressure touch input to the end mark displayed on the touch screen, by executing an icon, by moving the pressure touch input to the virtual touch pad to an area outside the virtual touch pad, or by releasing the pressure touch input to the virtual touch pad without selecting the icon.

31. A terminal comprising:
a touch screen; and
a controller which determines whether a hovering input by an object to a position of the touch screen meets a predetermined condition, enters a virtual touch pad mode when the hovering input meets the predetermined condition, and operates the virtual touch pad,
wherein the predetermined condition is a condition that the object hovers over the touch screen during a time period longer than a predetermined period of time, and
wherein, in the virtual touch pad mode, the virtual touch pad is displayed on the touch screen.

* * * * *